(12) United States Patent
Imai et al.

(10) Patent No.: US 7,081,486 B2
(45) Date of Patent: Jul. 25, 2006

(54) METHOD OF PRODUCING POLYMER

(75) Inventors: Genji Imai, Kanagawa (JP); Takeshi Sako, Shizuoka (JP)

(73) Assignees: Shizuoka University, Shizuoka (JP); Kansai Paint Co., Ltd., Amagasaki (JP)

( * ) Notice: Subject to any disclaimer, the term of this patent is extended or adjusted under 35 U.S.C. 154(b) by 4 days.

(21) Appl. No.: 10/488,075

(22) PCT Filed: Dec. 26, 2003

(86) PCT No.: PCT/JP03/16850

§ 371 (c)(1),
(2), (4) Date: Jul. 28, 2004

(87) PCT Pub. No.: WO2004/076498

PCT Pub. Date: Sep. 10, 2004

(65) Prior Publication Data

US 2005/0143481 A1    Jun. 30, 2005

(30) Foreign Application Priority Data

Feb. 25, 2003    (JP) .............................. 2003-047994

(51) Int. Cl.
- C08J 3/28 (2006.01)
- C08F 2/06 (2006.01)
- C08F 2/46 (2006.01)
- C08F 22/38 (2006.01)

(52) U.S. Cl. .............................. 522/60; 522/62; 522/79; 522/167; 427/504; 427/510

(58) Field of Classification Search .................. 522/60, 522/62, 79, 167
See application file for complete search history.

(56) References Cited

U.S. PATENT DOCUMENTS

| 4,944,837 | A | * | 7/1990 | Nishikawa et al. | ............ 216/41 |
| 5,387,619 | A | * | 2/1995 | Lee et al. | ................... 521/133 |
| 5,509,959 | A | * | 4/1996 | Nielsen et al. | ......... 106/287.35 |
| 5,872,157 | A | * | 2/1999 | DeSimone et al. | ............ 522/5 |
| 6,314,225 | B1 | * | 11/2001 | Wang | .......................... 385/123 |
| 6,749,902 | B1 | * | 6/2004 | Yonker et al. | .............. 427/458 |
| 2003/0091935 | A1 | * | 5/2003 | Gleason et al. | ............. 430/311 |

FOREIGN PATENT DOCUMENTS

| JP | 5-125362 | 5/1993 |
| JP | 7-149721 | 6/1995 |
| JP | 7-505429 | 6/1995 |
| JP | 8-104830 | 4/1996 |
| JP | 2000-26509 | 1/2000 |
| JP | 2001-131208 | 5/2001 |

(Continued)

OTHER PUBLICATIONS

Yoshinobu Tsujii, New Development of Polymer Brushes, Mirai Zairyuu (Future Materials), vol. 3 No. 2, pp. 48-55, the specification contains information on it.

(Continued)

*Primary Examiner*—Susan Berman
(74) *Attorney, Agent, or Firm*—Knobbe Martens Olson & Bear, LLP

(57) ABSTRACT

A method of producing a polymer according to the present invention is characterized by comprising a step of photopolymerizing one or more photopolymerizable polymerization precursors by irradiation with an activation energy ray in a supercritical fluid or in a subcritical fluid.

25 Claims, 6 Drawing Sheets

FOREIGN PATENT DOCUMENTS

| | | |
|---|---|---|
| JP | 2001-157802 | 6/2001 |
| JP | 2002-128808 | 5/2002 |
| JP | 2002-145971 | 5/2002 |
| JP | 2002-179707 | 6/2002 |
| JP | 2002-270540 | 9/2002 |
| JP | 2002-275205 | 9/2002 |
| JP | 2002-327003 | 11/2002 |
| JP | 2003-205537 | 7/2003 |

OTHER PUBLICATIONS

Masanori Kobayashi, et al. Dispersion Polymerization of Vinyl Monomers in Supercritical Carbon Dioxide, 75 [8], 371-377 (2002)—Abstract.

* cited by examiner

METHOD OF PRODUCING POLYMER

This application is the U.S. National Phase under 35 U.S.C. §371 of International Application PCT/JP03/16850, filed on Dec. 26, 2003, which claims priority of Japanese Patent Application No. 2003-047994, filed on Feb. 25, 2003. The International Application was published under PCT Article 21(2) in a language other than English.

TECHNICAL FIELD

The present invention relates to a method of producing a polymer by the use of a supercritical fluid or a subcritical fluid.

BACKGROUND ART

A supercritical fluid is a fluid having a density close to a liquid as well as a viscosity and a diffusion coefficient close to a gas. Since the supercritical fluid possesses both of diffusivity of the gas and substance solubility of the liquid, it has various effects as a reaction solvent.

Heretofore, the supercritical fluid has been utilized for extractive separation of effective ingredients and extractive removal of unnecessary ingredients such as extraction of hop extracts and fragrant materials, and decaffeination from coffee and tobacco by the use of its dissolving power. For example, caffeine-free coffee has been industrially manufactured by the utilization of supercritical carbon dioxide since around last half of 1970s.

In recent years, the supercritical fluids have been utilized for removal of impurities from chemical materials, products and the like, and concentration thereof, e.g., removal of unreacted monomers from a polymer, and concentration and dehydration of an alcohol. Furthermore, they have been also utilized for removal of a binder from ceramics, washing and drying of semiconductors and mechanical parts, and so forth. For example, Japanese Patent Application Laid-open No. 7-149721 discloses a method for purifying a bismaleimide compound which is characterized by subjecting an ether imide-based bismaleimide compound containing impurities such as aromatic hydrocarbon solvents used during the production of the same to an extractive removal treatment of the impurities in which the compound is brought into contact with carbon dioxide in a supercritical state or in a state close to the supercritical state having a pressure of 60 atm or higher and a temperature of 20° C. or higher.

In addition to the above, the supercritical fluids have been utilized for the formation of fine particles, thin films and microfilaments by rapid expansion (RESS method), e.g., the production of whisker-like fine particles of silica or the like. Moreover, they have been also utilized for the formation of fine particles and thin films by a conversion technique into a poor solvent (GAS method), e.g., strength enhancement (surface coating) of silica aerogel. For example, Japanese Patent Application Laid-open No. 8-104830 discloses a production method of fine particles for a paint wherein a polymer polymerization reaction solution in a polymerization step for producing a polymeric solid material for the paint is dissolved in a supercritical phase by the use of carbon dioxide and a polar organic solvent, and then rapidly expanded.

Meanwhile, heretofore, polymers such as the fine particles for the paint have been produced by a solution polymerization method or the like using a large amount of an organic solvent, in consideration of the control of a polymerization reaction rate, the handling of the polymerized product and the like. However, in the solution polymerization method, the polymer is formed in a solution state containing the solvent in about half amount, and hence a solvent removing step is necessary where the solvent is removed from the resulting polymer solution after the polymerization and the polymer is then dried, which means that the process is troublesome. In addition, it is also troublesome to treat the organic solvent which vaporizes in the solvent removing step.

Recently, it has been attempted to produce the polymer by the use of a supercritical fluid, particularly supercritical carbon dioxide as the solvent. In the case of using supercritical carbon dioxide as the solvent, the removal of the solvent after polymerization and the drying are unnecessary, and therefore the process can be simplified and costs can be reduced. Moreover, since no organic solvent is used, a burden to environment is also slight. In addition, carbon dioxide can be easily recovered and re-used as compared with the organic solvent. Furthermore, in many cases, there is a difference in solubility in carbon dioxide between the polymer and monomers, so that amounts of the unreacted monomers contained in the polymer which is the product are reduced by using supercritical carbon dioxide as the solvent, to enable the production of the more highly pure polymer.

As a production method of a polymer by the use of the supercritical fluid, for example, Japanese PCT Patent Application Laid-open No. 7-505429 discloses a production method of a fluoro-polymer comprising a step of solubilizing a fluoro-monomer in a solvent comprising supercritical carbon dioxide, and a step of thermally polymerizing the fluoro-monomer in the solvent in the presence of a radical polymerization initiator to produce the fluoro-polymer.

Japanese Patent Application Laid-open No. 2000-26509 discloses a production method of a fluoro-polymer wherein at least one fluorinated monomer is thermally polymerized in supercritical carbon dioxide by the use of dimethyl (2,2'-azobisisobutyrate) as a initiator.

Japanese Patent Application Laid-open No. 2002-327003 discloses a production method of a fluorinated alkyl group-containing polymer which comprises the step of thermally polymerizing a radical polymerizable monomer component containing a fluorinated alkyl group-containing (meth)acrylate in an amount of 20% by weight or more by the use of supercritical carbon dioxide as a polymerization solvent.

Japanese Patent Application Laid-open No. 2001-151802 discloses a production method of polymer fine powder which comprises the step of carrying out thermal radical polymerization of a monomer composition containing an ethylenically unsaturated monomer having a carboxyl group such as (meth)acrylic acid in supercritical carbon dioxide to form the polymer fine powder.

Japanese Patent Application Laid-open No. 2002-179707 discloses a production method of polymer fine particles which comprises the step of carrying out thermal polymerization of a monomer such as methyl methacrylate in supercritical carbon dioxide by the action of a radical polymerization initiator which is a polymer having a specific structure substantially soluble in supercritical carbon dioxide.

In addition, Japanese Patent Application Laid-open No. 2002-128808 discloses a production method of a polymer which comprises the step of carrying out thermal radical polymerization of a polymerizable monomer such as methyl methacrylate or styrene in supercritical carbon dioxide in the presence of a specific non-polymerizable dispersant such as docosanoic acid or myristic acid.

Masanori Kobayashi et al., "Dispersion Polymerization of Vinyl Monomers Using Supercritical Carbon Dioxide", "Sikizai (Coloring Material)", 2002, Vol. 75, No. 8, p. 371–377 describes that poly(1,1,2,2-tetrahydroheptadecafluorodecyl acrylate) and poly(1,1,2,2-tetrahydroheptadecafluorodecyl methacrylate) obtained by a polymerization reaction using supercritical carbon dioxide as a solvent are used as surface active agents, and supercritical carbon dioxide is used as a solvent to carry out a dispersion polymerization of various acrylic monomers.

As mentioned above, there has been already investigated the production method of the polymer which comprises the step of carrying out thermal polymerization of a monomer in a supercritical fluid such as supercritical carbon dioxide, but a production method of a polymer which comprises the step of photo-polymerizing a monomer in the supercritical fluid is not known.

Meanwhile, in recent years, a polymer brush attracts attention owing to its unique morphology. The polymer brush has a structure where polymer chains, whose terminal is immobilized to a solid surface (by chemical bond or adsorption), are stretched in the direction perpendicular to the solid surface. The extent of the stretching of the polymer chains noticeably depends on a graft density.

The polymer brush is usually obtained by grafting polymer chains onto a solid surface by surface graft polymerization, especially surface-initiated living radical polymerization.

For example, Japanese Patent Application Laid-open No. 2001-131208 discloses a production method of a polymer brush base material which comprises a step of providing a base material to which one or more free-radical initiators each having a radical formation site at a distant position from the base material are covalently bonded, and a step of bringing the covalently-bonded base material into contact with a monomer under conditions for accelerating free-radical polymerization from the radical formation sites of the initiators to form a polymer brush.

Moreover, Japanese Patent Application Laid-open No. 2002-145971 describes a production method of a polymer brush by surface-initiated living radical polymerization. Specifically, the surface-initiated living radical polymerization comprises a step of immobilizing a polymerization initiator onto a solid surface by the Langmuir-Blodgett (LB) method or a chemical adsorption method, and then a step of growing a polymer chain (graft chain) on the solid surface by living radical polymerization (ATRP method). Japanese Patent Application Laid-open No. 2002-145971 describes that polymer chains having a regulated length and length distribution can be grown on the surface of a base material with an unprecedentedly high surface density by the surface-initiated living radical polymerization, and they are then swollen in a solvent owing to the high graft density to provide a film thickness comparable to a fully stretched chain length and to thereby realize a "polymer brush" state in a true sense for the first time. Furthermore, Japanese Patent Application Laid-open No. 2002-145971 describes that in the conventional surface-initiated radical polymerization, a radical once generated continues to grow until its irreversible termination to form a graft chain sequentially and hence graft polymerization in the vicinity of the graft chains previously grown is inhibited owing to the steric hindrance of the graft chains, but in the present system, polymerization proceeds in a living manner, that is, all the graft chains grow almost evenly and hence steric hindrance among neighboring graft chains is reduced, the fact being considered to be one cause of obtaining the high graft density.

In addition, Japanese Patent Application Laid-open No. 2002-145971 mentioned above discloses a nano-structural functional material wherein a chemical composition of a graft polymer chain constituting a graft polymer layer arranged on a base material by graft polymerization is converted into a multilayered structure in the film thickness direction by copolymerization with a different kind of a monomer or an oligomer, obtained by such surface-initiated living radical polymerization. Furthermore, Japanese Patent Application Laid-open No. 2002-145971 mentioned above also discloses a nano-structural functional material wherein a polymerization initiating portion (polymerization initiating group) of a molecule arranged on the surface of a base material is inactivated with a predetermined pattern in the film surface direction and then the polymerization initiating portion not inactivated is subjected to graft polymerization to arrange a graft polymer layer with a predetermined pattern.

Furthermore, high density (dense) polymer brushes obtained by surface-initiated living radical polymerization are described in detail in Takanobu Tsujii, "New Development of Polymer Brushes", "Mirai Zairyou (Future Materials)", Vol. 3, No. 2, p. 48–55.

In this connection, in these conventional polymer brushes, the polymer chains (graft chains) are possible to have a fully stretched structure only in a good solvent, and the polymer chains (graft chains) has a fallen structure or a folded structure in a dry state or in a poor solvent.

DISCLOSURE OF THE INVENTION

An object of the present invention is to provide a method of producing a polymer comprising a step of photopolymerizing a photopolymerizable polymerization precursor (monomer etc.) in a supercritical fluid or in a subcritical fluid.

The invention relates to a method of producing a polymer comprising a step of photopolymerizing one or more photopolymerizable polymerization precursors by irradiation with an activation energy ray in a supercritical fluid or in a subcritical fluid.

Moreover, the invention relates to the above method, wherein the polymer to be produced is a film.

Furthermore, the invention relates to the above method, wherein a polymer film is formed on an activation energy ray-transmittable base material which is placed so as to be exposed to the supercritical fluid or subcritical fluid.

In addition, the invention relates to the above method, wherein one or more photopolymerizable polymerization precursors are irradiated with an activation energy ray through the activation energy ray-transmittable base material which is placed so that a surface thereof through which the activation energy ray is incident is not exposed to the supercritical fluid or subcritical fluid and another surface thereof through which the activation energy ray is outgoing is exposed to the supercritical fluid or subcritical fluid, to photopolymerize the one or more polymerization precursors, whereby the polymer film is formed on the activation energy ray outgoing surface of the activation energy ray-transmittable base material.

Moreover, the invention relates to the above method, wherein the activation energy ray-transmittable base material is irradiated with the activation energy ray through a mask pattern to selectively form the polymer film on an activation energy ray-transmitted part of the activation energy ray outgoing surface of the activation energy ray-transmittable base material.

Furthermore, the invention relates to the above method, wherein the polymer to be produced is a polymer containing a furry protrusion.

Moreover, the invention relates to the above method, wherein the polymer containing the furry protrusion is formed on the activation energy ray-transmittable base material which is placed so as to be exposed to the supercritical fluid or subcritical fluid.

Furthermore, the invention relates to the above method, wherein one or more photopolymerizable polymerization precursors are irradiated with an activation energy ray through the activation energy ray-transmittable base material which is placed so that a surface thereof through which the activation energy ray is incident is not exposed to the supercritical fluid or subcritical fluid and another surface thereof through which the activation energy ray is outgoing is exposed to the supercritical fluid or subcritical fluid, to photopolymerize the one or more polymerization precursors, whereby the polymer containing the furry protrusion is formed on the activation energy ray outgoing surface of the activation energy ray-transmittable base material.

In addition, the invention relates to the above method, wherein the activation energy ray-transmittable base material is irradiated with the activation energy ray through a mask pattern to selectively form the polymer containing the furry protrusion on an activation energy ray-transmitted part of the activation energy ray outgoing surface of the activation energy ray-transmittable base material.

Herein, "a polymer containing a furry protrusion" means a protruding polymer or a polymer having one or more furry protrusions. In the case of the protruding polymer, the polymer itself is called a "furry protrusion", while in the case of the polymer having one or more furry protrusions, the furry protrusion is called a "furry protrusion". The "polymer containing the furry protrusion" includes a so-called polymer brush, but is not limited thereto.

Moreover, in the case that the diameter of the furry protrusion (length of the furry protrusion in the direction parallel to the surface of the base material) is not constant, the longest diameter (major axis or major side) at the bottom of the furry protrusion is determined as the diameter.

Furthermore, "a polymer film" includes porous one.

DESCRIPTION OF THE MAIN SYMBOLS

Figure 1:
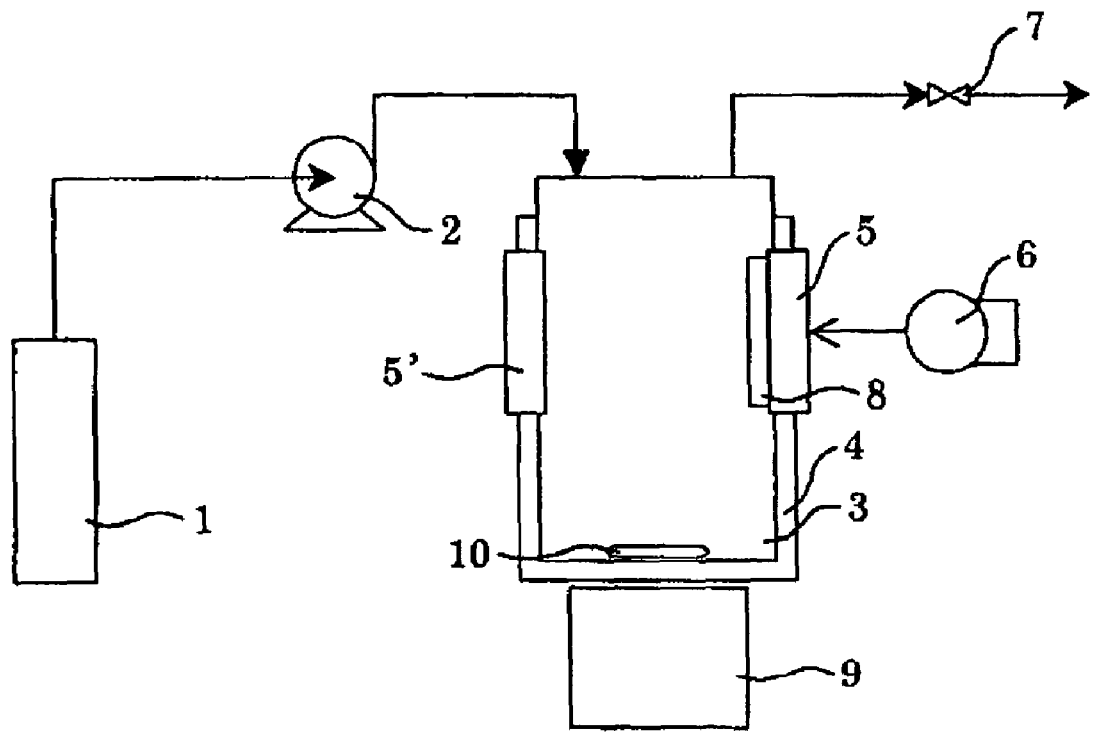
FIG. 1 is a schematic constitutional drawing of one example of production apparatus for carrying out the method of producing the polymer of the present invention.

1 Carbon dioxide cylinder
2 Pump for carbon dioxide supply
3 Reactor
4 Temperature-controlling means
5 Window
5' Window
6 Light source
7 Pressure-reducing valve
8 Activation energy ray-transmittable base material
9 Magnetic stirrer
10 Stirring bar
11 Base material
12 Polymer film

BEST MODE FOR CARRYING OUT THE INVENTION

According to the invention, a photopolymerizable polymerization precursor (hereinafter, also referred to as "polymerization precursor") is photopolymerized in a supercritical fluid or in a subcritical fluid, whereby a polymer can be produced.

Moreover, according to the invention, the polymerization precursor is photopolymerized in the supercritical fluid or in the subcritical fluid, whereby a polymer film can be formed on a base material. Furthermore, the polymer film can be selectively formed on the activation energy ray-transmitted part of the activation energy ray outgoing surface of the base material by irradiation of the base material with an activation energy ray through a mask pattern and transmitting the ray. That is, a polymer film having a desired fine pattern can be formed on the base material.

In addition, according to the invention, the polymerization precursor is photopolymerized in the supercritical fluid or in the subcritical fluid, whereby a polymer containing a furry protrusion can be formed on the base material. Furthermore, the polymer containing the furry protrusion can be selectively formed on the activation energy ray-transmitted part of the activation energy ray outgoing surface of the base material by irradiation of the base material with the activation energy ray through a mask pattern and transmitting the ray. That is, a polymer containing a furry protrusion having a desired fine pattern can be formed on the base material.

The following will describe the invention in detail.

In the invention, a supercritical fluid or a subcritical fluid is used as a polymerization solvent.

The supercritical fluid means a fluid in a state where both of temperature and pressure exceed their critical points, i.e., in a state of a temperature equal to or higher than the critical temperature and a pressure equal to or higher than the critical pressure. The critical temperature and the critical pressure are values inherent in a substance. For example, the critical temperature and critical pressure of carbon dioxide are 30.9° C. and 7.38 MPa, respectively. The critical temperature and critical pressure of methanol are 239.4° C. and 8.09 MPa, respectively. The critical temperature and critical pressure of water are 374.1° C. and 22.12 MPa, respectively.

Moreover, the subcritical fluid is a fluid which exhibits operations and effects similar to the case of supercritical fluid, and is usually a fluid having a temperature of 0.65 time as much as the critical temperature by the Kelvin scale or higher and a pressure of 0.65 time as much as the critical pressure or higher.

The supercritical fluid or subcritical fluid may be suitably selected depending on the solubility of the polymerization precursor and the like. Examples of the supercritical fluid or subcritical fluid include carbon dioxide, water, methane, ethane, ethylene, propane, propylene, alcohols such as methanol, ammonia, chlorofluorocarbon, carbon monoxide, and the like, and also inorganic gases such as nitrogen, helium, and argon. The supercritical fluid or subcritical fluid can be a mixture of two or more of them.

In the invention, the supercritical fluid or subcritical fluid is preferably supercritical carbon dioxide or subcritical carbon dioxide since a supercritical state or a subcritical state is achieved at a relatively low temperature under a relatively low pressure.

The using amount of the supercritical fluid or subcritical fluid may be suitably determined depending on the polymerization precursor, reaction conditions and the like. For example, the charging concentration of the polymerization precursor can be about 1% by weight to about 70% by weight.

In the invention, the supercritical fluid or subcritical fluid is used as a reaction field but the other liquid or gas may be present therein.

In the invention, for the purpose of increasing the concentration of the polymerization precursor or photopolymerization initiator in the supercritical fluid phase or in the subcritical fluid phase, a co-solvent (entrainer) which assists to dissolve the solutes, i.e., the polymerization precursor or photopolymerization initiator may be used.

The entrainer can be suitably selected depending on the supercritical fluid or subcritical fluid and the polymerization precursor to be used, and the like.

In the case of using supercritical carbon dioxide or subcritical carbon dioxide, examples of the entrainer include methanol, ethanol, propane, butane, hexane, octane, acetic acid, ethyl acetate, acetone, water, acetonitrile, dichloromethane, and the like. The entrainer may be used singly or as a mixture of two or more of them.

The using amount of the entrainer can be suitably determined.

The pressure at the polymerization reaction (polymerization pressure) can be suitably determined depending on the supercritical fluid or subcritical fluid and the polymerization precursor, properties of the aimed polymer, and the like. The polymerization pressure is preferably 0.65 time as much as the critical pressure of the fluid or higher, more preferably equal to or more than the critical pressure. In the case of using supercritical carbon dioxide or subcritical carbon dioxide, the polymerization pressure is preferably 5 MPa or higher, more preferably 7 MPa or higher, particularly preferably the critical pressure, i.e., 7.4 MPa or higher. When the polymerization pressure is within this range, the polymerization reaction proceeds more favorably and a polymer having a higher quality is obtained. The upper limit of the polymerization pressure is not particularly limited, but can be usually set at a pressure in the range of 150 MPa or lower in terms of pressure tightness of apparatus.

The polymerization pressure may be maintained at a constant pressure from the start of the polymerization until the completion, or the pressure may be changed during the polymerization, e.g., the pressure may be elevated or reduced with the progress of the polymerization.

Moreover, the temperature at the polymerization reaction (polymerization temperature) can be suitably determined depending on the supercritical fluid or subcritical fluid and the polymerization precursor, properties of the aimed polymer, and the like. The polymerization temperature is preferably 0.65 time as much as the critical temperature of the fluid or higher, more preferably equal to or more than the critical temperature. In the case of using supercritical carbon dioxide or subcritical carbon dioxide, the polymerization temperature is preferably 20° C. or higher, more preferably 30° C. or higher, particularly preferably the critical temperature, i.e., 31° C. or higher. When the polymerization temperature is within this range, the polymerization reaction proceeds more favorably and a polymer having a higher quality is obtained. The upper limit of the polymerization temperature is not particularly limited, but can be usually set at a temperature in the range of 250° C. or lower.

The polymerization temperature may be maintained at a constant temperature from the start of the polymerization until the completion, or the temperature may be changed during the polymerization.

With regard to the supercritical fluid or subcritical fluid, the density and polarity thereof can be changed by the pressure or temperature, and thereby the solubility of the polymerization precursor in the solvent (the supercritical fluid or subcritical fluid) can be varied. Therefore, in the case that two or more polymerization precursors are polymerized, the composition of the resulting polymer can be controlled by controlling the polymerization pressure and polymerization temperature. Furthermore, it is also possible to change the composition of the resulting polymer, for example, in the direction of the film thickness or in the direction perpendicular to the base material by changing at least either of the pressure or the temperature during the polymerization.

In the invention, in the supercritical fluid or subcritical fluid as mentioned above, one or more polymerization precursors are photopolymerized by irradiation with an activation energy ray in the presence of a photopolymerization initiator, if necessary.

The activation energy ray for the irradiation can be suitably determined depending on the polymerization precursor, the photopolymerization initiator and the like. As the activation energy ray, an ultraviolet ray having a wavelength of 10 to 380 nm, a visible light ray having a wavelength of 380 to 780 nm, a near-infrared ray having a wavelength of 780 nm (0.78 µm) to 2.5 µm, and the like are mentioned. In many cases, as the activation energy ray, an ultraviolet ray or visible light ray having a wavelength of 500 nm or shorter, more preferably an ultraviolet ray or visible light ray having a wavelength of 420 nm or shorter, particularly an ultraviolet ray having a wavelength of 380 nm or shorter, furthermore an ultraviolet ray having a wavelength of 330 nm or shorter is employed.

In this connection, the activation energy ray for the irradiation may not be a ray having a single wavelength or a ray having a single peak in spectral distribution, and may have any spectral distribution as far as the ray contains a light having the above wavelength.

As lamps (light sources) for use in the irradiation with the activation energy ray, any of the lamps generally employed can be used, and examples thereof include an ultrahigh pressure mercury lamp, a high pressure mercury lamp, a medium pressure mercury lamp, a low pressure mercury lamp, a chemical lamp, a metal halide lamp, a carbon arc lamp, a xenon lamp, a mercury-xenon lamp, a tungsten lamp, a hydrogen lamp, a deuterium lamp, an excimer lamp, a short arc lamp, a laser having an oscillation ray at UV laser (wavelength: 351 nm to 364 nm), a helium-cadmium laser, an argon laser, an excimer laser, and the like.

The dose (integrating amount of light) of the activation energy ray can be suitably determined depending on the desired polymerization degree of the polymer, the desired film thickness of the polymer film, the desired height of the furry protrusion of the polymer containing the furry protrusion, and the like. The dose of the activation energy ray may be, for example, 0.5 mJ/cm$^2$ to 100 J/cm$^2$, more preferably 1 mJ/cm$^2$ or more and 10 J/cm$^2$ or less.

In this connection, the dose of the activation energy ray is defined by the following equation:

Dose of activation energy ray (J/cm²)=Intensity of activation energy ray (W/Cm²)×Irradiation time (sec).

The dose of the activation energy ray can be controlled by irradiation time, lamp power and the like.

The intensity of the activation energy ray can be suitably determined and can be, for example, 0.01 mW/cm² to 1 teraW/cm² (TW/cm²). Moreover, the irradiation time of the activation energy ray may be determined so that a desired dose can be obtained according to the intensity of the activation energy ray.

In the invention, photopolymerization can be carried out by dissolving and dispersing a polymerization precursor and a nano particle (an ultra-fine particle having an average particle size of, for example, 100 nm or less) preferably homogeneously in a supercritical fluid or in a subcritical fluid, and then irradiating the whole with an activation energy ray. Examples of the nano particles include nano carbon, CdSe, and the like. Thereby, a polymer or a polymer film (including a polymer containing a furry protrusion) wherein the nano particles are homogeneously dispersed can be formed. If necessary, the other additives can be added.

The polymerization precursor to be applied to the invention is not particularly limited as far as it dissolves in the solvent, i.e., the supercritical fluid or subcritical fluid and has photopolymerizability. The polymerization precursor can be polymerized in a state where part thereof is dissolved in the supercritical fluid or subcritical fluid. In addition, the polymerization precursor may be a monomer, an oligomer, or a polymer.

Examples of the polymerization precursor include compounds having one or more structures selected from the group consisting of a maleimide group optionally having a substituent, a (meth)acryloyl group optionally having a substituent, a cyclic ether structure optionally having a substituent, an alkenyl group optionally having a substituent, a vinylene group optionally having a substituent, a styryl group optionally having a substituent, and an azido group. Herein, the (meth)acryloyl group means an acryloyl group and a methacryloyl group. In the case that the polymerization precursor has two or more of these groups, the polymerization precursor may have only the same group or may have different groups. In this connection, the substituent is not particularly limited as far as it does not inhibit the polymerization reaction, and examples thereof include hydrocarbon groups having 12 carbon atoms or less, halogen atoms, an amino group, a carboxyl group, a hydroxyl group, a cyano group, and the like.

As the polymerization precursor, preferred is a spontaneously photopolymerizable compound which is a compound photopolymerizable in the absence of a photopolymerization initiator.

As the polymerization precursor which is a spontaneously photopolymerizable compound, there is mentioned, for example, a maleimide-based compound having at least one maleimide group at the terminal, specifically a maleimide-based compound represented by the following general formula (1):

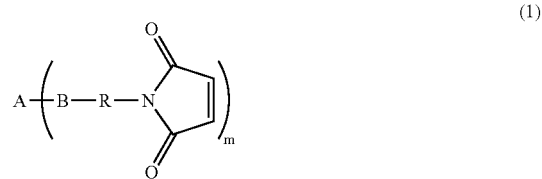

wherein A represents a hydrocarbon group optionally having a substituent, or a (poly)ether connecting chain or a (poly)ether residue, (poly)ester connecting chain or a (poly)ester residue, (poly)urethane connecting chain or a (poly)urethane residue, or a (poly)carbonate connecting chain or (poly)carbonate residue having a molecular weight of 40 to 100,000 to which a hydrocarbon group optionally having a substituent is bonded via at least one bond selected from the group consisting of an ether bond, an ester bond, a urethane bond, and a carbonate bond; B represents an ether bond, an ester bond, a urethane bond, or a carbonate bond; R represents a hydrocarbon group optionally having a substituent; and m represents an integer of 1 to 6; provided that all of B or R are not necessarily the same and two or more kinds of B or R may be present when m is an integer of 2 or larger.

In view of forming a cured film by itself, m in the general formula (1) is preferably an integer of 2 to 6.

R in the general formula (1) is preferably an alkylene group, a cycloalkylene group, an arylalkylene group, or a cycloalkylalkylene group. The alkylene group herein may be a linear one or a branched one. The arylalkylene group or cycloalkylalkylene group may have an aryl group or a cycloalkyl group in the main chain or may have an aryl group or a cycloalkyl group in the branched chain. In view of curability, R is preferably a linear alkylene group having 1 to 5 carbon atoms or a branched alkylene group having 1 to 5 carbon atoms.

Specific examples of R in the general formula (1) include linear alkylene groups such as a methylene group, an ethylene group, a trimethylene group, a tetramethylene group, a pentamethylene group, a hexamethylene group, a heptamethylene group, an octamethylene group, a nonamethylene group, a decamethylene group, an undecamethylene group, and a dodecamethylene group; branched alkylene groups such as a 1-methylethylene group, a 1-methyl-trimethylene group, a 2-methyl-trimethylene group, a 1-methyl-tetramethylene group, a 2-methyl-tetramethylene group, a 1-methyl-pentamethylene group, a 2-methyl-pentamethylene group, a 3-methyl-pentamethylene group, and a neopentyl group; cycloalkylene groups such as a cyclopentylene group and a cyclohexylene group; arylalkylene groups having an aryl group in the main chain or the side chain, such as a benzylene group, a 2,2-diphenyl-trimethylene group, 1-phenyl-ethylene group, 1-phenyl-tetraethylene group, and 2-phenyl-tetraethylene group; cycloalkyl-alkylene groups having a cycloalkyl group in the main chain or the side chain, such as a cyclohexylmethylene group, a 1-cyclohexyl-ethylene group, a 1-cyclohexyl-tetraethylene group, and a 2-cyclohexyl-tetraethylene group; and the like.

A in the general formula (1) represents a hydrocarbon group optionally having a substituent, or a (poly)ether connecting chain or a (poly)ether residue (A-1), (poly)ester connecting chain or a (poly)ester residue (A-2), (poly)urethane connecting chain or a (poly)urethane residue (A-3), or a (poly)carbonate connecting chain or (poly)carbonate residue (A-4) having a molecular weight of 40 to 100,000 to which a hydrocarbon group optionally having a substituent is bonded via at least one bond selected from the group consisting of an ether bond, an ester bond, a urethane bond, and a carbonate bond. A may be a connecting chain constituted by an oligomer or polymer wherein these connecting chains are repeated as one repeating unit.

Specific examples of A in the general formula (1) include the hydrocarbon groups mentioned as specific examples of R.

In addition, as A in the general formula (1), there are mentioned a connecting chain or a residue (A-1) constituted by a (poly)ether(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ether bond; a connecting chain or residue (A-2-1) constituted by a (poly)ester(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ester bond; a connecting chain or residue (A-2-2) constituted by a (poly)carboxylic acid{(poly)ether(poly)ol}ester having a polycarboxylic acid residue in the terminal, obtainable by esterifying a (poly)ether(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ether bond, with a di-, tri-, penta-, or hexa-carboxylic acid (hereinafter, abbreviated as polycarboxylic acid); a connecting chain or residue (A-2-3) constituted by a (poly)carboxylic acid{(poly)ester(poly)ol}ester having a polycarboxylic acid residue in the terminal, obtainable by esterifying a (poly)ester(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ether bond and an ester bond, with a polycarboxylic acid; a connecting chain or residue (A-5) obtainable by ring-opening a (poly)epoxide having a molecular weight of 100 to 40,000 and having one unit or repeating units in which at least one hydrocarbon group selected from the group consisting of a linear alkylene group, a branched alkylene group, a cycloalkylene group, and an aryl group is bonded via an ether bond; a connecting chain or residue (A-3-1) constituted by a (poly)ether(poly)isocyanate obtainable by urethane formation of a (poly)ether(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ether bond, with an organic (poly)isocyanate; a connecting chain or residue (A-3-2) constituted by a (poly)ester(poly)isocyanate obtainable by urethane formation of a (poly)ester(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ester bond, with an organic (poly)isocyanate; a connecting chain or residue (A-4) constituted by a carbonic acid ester of a (poly)ether(poly)ol having a molecular weight of 40 to 100,000 and having one unit or repeating units in which at least one hydrocarbon group selected from the group consisting of a linear alkylene group, a branched alkylene group, a cycloalkylene group, and an aryl group is bonded via an ether bond; and the like. In this connection, (A-2-1), (A-2-2), and (A-2-3) are included in the (poly)ester connecting chain or (poly)ester residue (A-2) in the general formula (1). Also, (A-3-1) and (A-3-2) are included in the (poly)urethane connecting chain or (poly)urethane residue (A-3) in the general formula (1).

Examples of the (poly)ether(poly)ol constituting the above connecting chain or residue (A-1) include polyalkylene glycols such as polyethylene glycol, polypropylene glycol, polybutylene glycol, and polytetramethylene glycol; and ethylene oxide-modified products, propylene oxide-modified products, butylene oxide-modified products, and tetrahydrofuran-modified products of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, and dipentaerythritol. Of these, various modified products of alkylene glycols are preferred. Furthermore, the (poly)ether(poly)ol constituting the above connecting chain or residue (A-1) include copolymers of ethylene oxide and propylene oxide, copolymers of propylene glycol and tetrahydrofuran, copolymers of ethylene glycol and tetrahydrofuran, hydrocarbon-based polyols such as polyisoprene glycol, hydrogenated polyisoprene glycol, polybutadiene glycol, and hydrogenated polybutadiene glycol, polyhydric hydroxyl compounds such as polytetramethylene hexaglyceryl ether (tetrahydrofuran-modified products of hexaglycerin), and the like.

Examples of the (poly)ester(poly)ol constituting the above connecting chain or residue (A-2-1) include ε-caprolactone-modified products, γ-butyrolactone-modified products, δ-valerolactone-modified products, or methylvalerolactone-modified products of polyalkylene glycols such as polyethylene glycol, polypropylene glycol, polybutylene glycol, and polytetramethylene glycol or alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, and dipentaerythritol; aliphatic polyesterpolyols which are esterification products of aliphatic dicarboxylic acids such as adipic acid and dimer acid with polyols such as neopentyl glycol and methylpentanediol; polyesterpolyols such as aromatic polyesterpolyols which are esterification products of aromatic dicarboxylic acids such as terephthalic acid with polyols such as neopentyl glycol; esterification products of polyhydric hydroxyl compounds such as polycarbonate polyols, acryl polyols, polytetramethylene hexaglyceryl ether (tetrahydrofuran-modified product of hexaglycerin) with dicarboxylic acids such as fumaric acid, phthalic acid, isophthalic acid, itaconic acid, adipic acid, sebacic acid, and maleic acid; polyhydric hydroxyl compounds such as monoglycerides obtainable by ester-exchange reaction of polyhydric hydroxyl compounds such as glycerin with fatty acid esters; and the like.

Examples of the (poly)carboxylic acid{(poly)ether(poly)ol}ester constituting the above connecting chain or residue (A-2-2) and having a polycarboxylic acid in the terminal include (poly)carboxylic acid{(poly)ether(poly)ol}esters having a polycarboxylic acid in the terminal, which are obtainable by esterification of polycarboxylic acids such as succinic acid, adipic acid, phthalic acid, hexahydrophthalic acid, tetrahydrophthalic acid, fumaric acid, isophthalic acid, itaconic acid, adipic acid, sebacic acid, maleic acid, trimellitic acid, pyromellitic acid, benzenepentacarboxylic acid, benzenehexacarboxylic acid, citric acid, tetrahydrofurantetracarboxylic acid, and cyclohexanetricarboxylic acid with the (poly)ether(poly)ols shown in the above (A-1), and the like.

Examples of the (poly)carboxylic acid{(poly)ester(poly)ol}ester constituting the above connecting chain or residue (A-2-3) and having a polycarboxylic acid in the terminal include (poly)carboxylic acid{(poly)ester(poly)ol}esters having a polycarboxylic acid in the terminal, which are obtainable by esterification of di-, tri-, penta-, and hexacarboxylic acids such as succinic acid, adipic acid, phthalic acid, hexahydrophthalic acid, tetrahydrophthalic acid, fumaric acid, isophthalic acid, itaconic acid, adipic acid, sebacic acid, maleic acid, trimellitic acid, pyromellitic acid, benzenepentacarboxylic acid, benzenehexacarboxylic acid, citric acid, tetrahydrofurantetracarboxylic acid, and cyclohexanetricarboxylic acid with the (poly)ester(poly)ols shown in the above (A-2).

Examples of the (poly)epoxide constituting the above connecting chain or residue (A-5) include epichlorohydrin-modified bisphenol-type epoxy resins synthesized from (methyl)epichlorohydrin and bisphenol A, bisphenol F, their ethylene oxide-modified products and propylene oxide-modified products, or the like; epichlorohydrin-modified hydrogenated bisphenol-type epoxy resins and epoxy novolak resins synthesized from (methyl)epichlorohydrin and hydrogenated bisphenol A, hydrogenated bisphenol F, their ethylene oxide-modified products and propylene oxide-modified products, or the like; reaction products of phenol, biphenol, and the like with (methyl)epichlorohydrin; aromatic epoxy resins such as glycidyl esters of terephthalic acid, isophthalic acid, or pyromellitic acid; polyglycidyl ethers of glycols such as (poly)ethylene glycol, (poly)propylene glycol, (poly)butylene glycol, (poly)tetramethylene glycol, and neopentyl glycol and their alkylene oxide-modified products; glycidyl ethers of aliphatic polyhydric alcohols such as trimethylolpropane, trimethylolethane, glycerin, diglycerin, erythritol, pentaerythritol, sorbitol, 1,4-butanediol, and 1,6-hexanediol and their alkylene oxide-modified products; glycidyl esters of carboxylic acids such as adipic acid, sebacic acid, maleic acid, and itaconic acid; glycidyl ethers of polyesterpolyols of polyhydric alcohols with polyhydric acids; copolymers of glycidyl (meth)acrylate or methylglycidyl (meth)acrylate; glycidyl esters of higher fatty acids, aliphatic epoxy resins such as epoxidized linseed oil, epoxidized soybean oil, epoxidized ricinus oil, and epoxidized polybutadiene; and the like.

Examples of the (poly)ether(poly)isocyanate constituting the above connecting chain or residue (A-3) include (poly)ether(poly)isocyanates obtainable by urethane-forming reaction of (poly)ether(poly)ols with polyisocyanates, e.g., aliphatic diisocyanate compounds such as methylene diisocyanate, hexamethylene diisocyanate, trimethylhexamethylene diisocyanate, tetramethylene diisocyanate, lysine diisocyanate, dimer acid diisocyanate; aromatic diisocyanate compounds such as 2,4-tolylene diisocyanate, dimer of 2,4-tolylene diisocyanate, 2,6-tolylene diisocyanate, p-xylylene diisocyanate, m-xylylene diisocyanate, 4,4'-diphenylmethane diisocyanate, 1,5-naphthylene diisocyanate, and 3,3'-dimethylbiphenyl-4,4'-diisocyanate; alicyclic diisocyanates such as isophorone diisocyanate, 4,4'-methylenebis(cyclohexyl isocyanate), methylcyclohexane-2,4-diisocyanate, methylcyclohexane-2,6-diisocyanate, and 1,3-(isocyanatomethylene)cyclohexane; and the like.

Examples of the (poly)ether(poly)ol for use in the reaction with the polyisocyanates include polyalkylene glycols such as polyethylene glycol, polypropylene glycol, polybutylene glycol, and polytetramethylene glycol; and ethylene oxide-modified products, propylene oxide-modified products, butylene oxide-modified products, and tetrahydrofuran-modified products of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, dipentaerythritol, and the like. Of these, various modified products of alkylene glycols are preferred. Furthermore, the (poly)ether(poly)ols for use in the reaction with the polyisocyanates include copolymers of ethylene oxide and propylene oxide, copolymers of propylene glycol and tetrahydrofuran, copolymers of ethylene glycol and tetrahydrofuran, hydrocarbon-based polyols such as polyisoprene glycol, hydrogenated polyisoprene glycol, polybutadiene glycol, and hydrogenated polybutadiene glycol; polyhydric hydroxyl compounds such as polytetramethylene hexaglyceryl ether (tetrahydrofuran-modified products of hexaglycerin), and the like.

Examples of the (poly)ester(poly)isocyanate constituting the above connecting chain or residue (A-3-1) include (poly)ester(poly)isocyanates obtainable by urethane-formation of the polyisocyanates mentioned in the connecting chain or residue (A-1) with (poly)ester(poly)ols, and the like.

Examples of the (poly)ester(poly)ol for use in the reaction with the polyisocyanates include ε-caprolactone-modified products, γ-butyrolactone-modified products, δ-valerolactone-modified products, or methylvalerolactone-modified products of alkylene glycols such as ethylene glycol, propanediol, propylene glycol, tetramethylene glycol, pentamethylene glycol, hexanediol, neopentyl glycol, glycerin, trimethylolpropane, pentaerythritol, diglycerin, ditrimethylolpropane, and dipentaerythritol; aliphatic polyesterpolyols which are esterification products of aliphatic dicarboxylic acids such as adipic acid and dimer acid with polyols such as neopentyl glycol and methylpentanediol; polyesterpolyols such as aromatic polyesterpolyols which are esterification products of aromatic dicarboxylic acids such as terephthalic acid with polyols such as neopentyl glycol; esterification products of polyhydric hydroxyl compounds such as polycarbonate polyols, acryl polyols, polytetramethylene hexaglyceryl ether (tetrahydrofuran-modified product of hexaglycerin) with dicarboxylic acids such as fumaric acid, phthalic acid, isophthalic acid, itaconic acid, adipic acid, sebacic acid, and maleic acid; polyhydric hydroxyl compounds such as monoglycerides obtainable by ester-exchange reaction of polyhydric hydroxyl compounds such as glycerin with aliphatic esters; and the like.

Examples of the (poly)ether(poly)ol constituting the above connecting chain or residue (A-4) include (poly)ether(poly)ols mentioned in the connecting chain or residue (A-1), and the like.

As compounds for use in carbonic acid ester formation with the (poly)ether(poly)ols, diethyl carbonate, dipropyl carbonate, phosgene, and the like may be mentioned. Also, polycarbonate can be formed by alternating copolymerization of an epoxide with carbon dioxide.

Of these, A in the general formula (1) is preferably a (poly)ether connecting chain or (poly)ether residue (A-1) or a (poly)ester connecting chain or (poly)ester residue (A-2) having a molecular weight of 100 to 100,000 wherein at least one group selected from the group consisting of a linear alkylene group having 2 to 24 carbon atoms, a branched alkylene group having 2 to 24 carbon atoms, a hydroxyl group-containing alkylene group having 2 to 24 carbon atoms, cycloalkylene group, an aryl group, and an arylalkylene group is bonded via at least one bond selected from the group consisting of an ether bond and an ester bond, more preferably a (poly)ether connecting chain or (poly)ether residue (A-1) having a molecular weight of 100 to 100,000 which comprises repeating units containing a linear alkylene group having 2 to 24 carbon atoms, a branched alkylene group having 2 to 24 carbon atoms, a hydroxyl group-containing alkylene group having 2 to 24 carbon atoms and/or an aryl group, and a (poly)ester connecting chain or (poly)ester residue (A-2) having a molecular weight of 100 to 100,000 which comprises repeating units containing a linear alkylene group having 2 to 24 carbon atoms, a branched alkylene group having 2 to 24 carbon atoms, a hydroxyl group-containing alkylene group having 2 to 24 carbon atoms and/or an aryl group.

In view of curability, the maleimide-based compound represented by the above general formula (1) is preferably a maleimide-based compound wherein R is an alkylene group having 1 to 5 carbon atoms, B is an ester bond represented by —COO— or —OCO—, A is a (poly)ether connecting chain or (poly)ether residue (A-1) having a molecular weight of 100 to 1,000 which comprises repeating units containing a linear alkylene group having 2 to 6 carbon atoms, a branched alkylene group having 2 to 6 carbon atoms, or a hydroxyl group-containing alkylene group having 2 to 6 carbon atoms.

As such a maleimide-based compound, a polyether bismaleimide acetate represented by the following general formula (2):

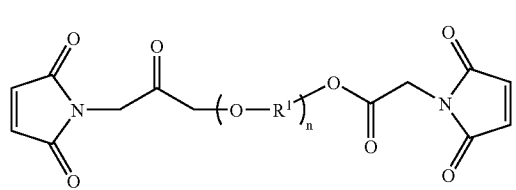

(2)

wherein $R^1$ represents an alkylene group and n is an integer of 1 to 1,000, may be mentioned, for example.

The maleimide-based compound represented by the above general formula (1) can be synthesized, for example, by a known method from a maleimide compound having a carboxyl group and a compound reactive to the carboxyl group. Examples of the compound reactive to the carboxyl group include bifunctional to hexafunctional polyols or polyepoxides having an average molecular weight of 100 to 1,000,000 and having one unit or repeating units in which at least one hydrocarbon group selected from the group consisting of a linear alkylene group, a branched alkylene group, a cycloalkylene group, and an aryl group is bonded via an ether bond and/or an ester bond, and the like.

Also, the maleimide-based compound represented by the above general formula (1) can be synthesized by a known method from a maleimide compound having a hydroxyl group and a compound reactive to the hydroxyl group. Examples of the compound reactive to the hydroxyl group include di-, tri-, penta-, and hexa-carboxylic acids having an average molecular weight of 100 to 1,000,000, having two to six carboxyl groups, ether bonds, or ester bonds in one molecule, and having one unit or repeating units in which at least one hydrocarbon group selected from the group consisting of a linear alkylene group, a branched alkylene group, a cycloalkylene group, and an aryl group is bonded via an ether bond and/or an ester bond, (poly)isocyanates, carbonic acid esters, phosgene, and the like.

As the polymerization precursors, in addition to the above, the following compounds may be mentioned.

Examples of the compounds having one maleimide group include methylmaleimide, hexylmaleimide, N-phenylmaleimide, N-(2-tert-butylphenyl)maleimide, N-(2-fluorophenyl)maleimide, N-(2-chlorophenyl)maleimide, N-(2-bromophenyl)maleimide, N-(2-iodophenyl)maleimide, N-cyclohexylmaleimide, N-laurylmaleimide, N,N'-methylenebis(N-phenyl)monomaleimide, hydroxymethylmaleimide, hydroxyethylmaleimide, 2-ethyl carbonate-ethylmaleimide, 2-isopropylurethane-ethylmaleimide, 2-acryloylethylmaleimide, acetoxyethylmaleimide, aminophenylmaleimide, N-(2-$CF_3$-phenyl)maleimide, N-(4-$CF_3$-phenyl)maleimide, N-(2-$CF_3$-phenyl)methylmaleimide, N-(2-bromo-3,5-$CF_3$-phenyl)maleimide, and the like.

Examples of the compounds having two or more maleimide groups include N,N'-ethylenebismaleimide, N,N'-hexamethylenebismaleimide, N,N'-4,4'-biphenylbismaleimide, N,N'-3,3'-biphenylbismaleimide, N,N'-(4,4'-diphenylmethane)bismaleimide, N,N'-3,3-diphenylmethanebismaleimide, N,N'-4,4-diphenylmethanebismaleimide, N,N'-methylenebis(3-chloro-p-phenylene)bismaleimide, N,N'-4,4'-dicyclohexylmethanebismaleimide, N,N'-(2,2'-diethyl-6,6'-dimethyl-4,4'-methylenediphenylene)bismaleimide, N,N'-1,2-phenylenebismaleimide, N,N'-1,3-phenylenebismaleimide, N,N'-1,4-phenylenebismaleimide, 2,2'-bis(4-N-maleimidephenyl)propane, 2,2'-bis[4-(4-N-maleimidephenoxy)phenyl]propane, 2,2'-bis[3-tert-butyl-5-methyl-4-(4-maleimidephenoxy)phenyl]propane, 2,2'-bis(4-N-maleimide-2-methyl-5-ethylphenyl)propane, 2,2'-bis(4-N-maleimide-2,5-dibromophenyl)propane, bis(4-N-maleimidephenyl)methane, bis(3,5-dimethyl-4-maleimidephenyl)methane, bis(3-ethyl-5-methyl-4-maleimidephenyl)methane, bis(3,5-diethyl-4-maleimidephenyl)methane, bis(3-methyl-4-maleimidephenyl)methane, bis(3-ethyl-4-maleimidephenyl)methane, m-di-N-maleimidebenzene, 2,6-bis[2-(4-maleimidephenyl)propyl]benzene, N,N'-2,4-toluylenebismaleimide, N,N'-2,6-toluylenebismaleimide, N,N'-4,4-diphenyl ether bismaleimide, N,N'-3,3-diphenyl ether bismaleimide, N,N'-4,4-diphenyl sulfide bismaleimide, N,N'-3,3-diphenyl sulfide bismaleimide, N,N'-4,4-diphenyl sulfone bismaleimide, N,N'-3,3-diphenyl sulfone bismaleimide, N,N'-4,4-diphenyl sulfone bismaleimide, N,N'-4,4-diphenyl ketone bismaleimide, N,N'-3,3-diphenyl ketone bismaleimide, N,N'-4,4-diphenyl-1,1-propanebismaleimide, N,N'-3,3-diphenyl-1,1-propanebismaleimide, 3,3'-dimethyl-N,N'-4,4-diphenylmethanebismaleimide, 3,3'-dimethyl-N,N'-4,4'-biphenylbismaleimide, 1,3-bis(3-maleimidephenoxybenzene, bis(4-maleimidephenyl)methane, bis[4-(3-maleimidephenoxy)phenyl]methane, 2,2-bis[4-(4-maleimidephenoxy)phenyl]methane, 1,1-bis[4-(4-maleimidephenoxy)phenyl]methane, 1,1-bis[3-methyl-4-(4-maleimidephenoxy)phenyl]methane, 1,1-bis[3-chloro-4-(4-maleimidephenoxy)phenyl]methane, 1,1-bis[3-bromo-4-(4-maleimidephenoxy)phenyl]methane, 1,1-bis[4-(3-maleimidephenoxy)phenyl]ethane, 1,2-bis[4-(3-maleimidephenoxy)phenyl]ethane, 1,1-bis[4-(4-maleimidephenoxy)phenyl]ethane, 1,1-bis[3-methyl-4-(4-maleimidephenoxy)phenyl]ethane, 1,1-bis[3-chloro-4-(4-maleimidephenoxy)phenyl]ethane, 1,1-bis[3-bromo-4-(4-maleimidephenoxy)phenyl]ethane, 2,2-bis(4- maleimidephenyl)propane, 2,2-bis[4-(3-maleimidephenoxy)phenyl]propane, 2,2-bis[4-(4-maleimidephenoxy)phenyl]propane, 2,2-bis[3-chloro-4-(4-maleimidephenoxy)phenyl]propane, 2,2-bis[3-bromo-4-(4-maleimidephenoxy)phenyl]propane, 2,2-bis[3-ethyl-4-(4-maleimidephenoxy)phenyl]propane, 2,2-bis[3-propyl-4-(4-maleimidephenoxy)phenyl]propane, 2,2-bis[3-isopropyl-4-(4-maleimidephenoxy)phenyl]propane, 2,2-bis[3-butyl-4-(4-maleimidephenoxy)phenyl]propane, 2,2-bis[3-sec-butyl-4-(4-maleimidephenoxy)phenyl]propane, 2,2-bis[3-methoxy-4-(4-maleimidephenoxy)phenyl]propane, 1,1-bis[4-(4-maleimidephenoxy)phenyl]propane, 2,2-bis[4-(3-maleimidephenoxy)phenyl]butane, 3,3-bis[4-(4-maleimidephenoxy)phenyl]pentane, 4,4'-bis(3-maleimidephenoxy)biphenyl, bis[4-(3-maleimidephenoxy)phenyl]ketone, bis[4-(3-maleimidephenoxy)phenyl]sulfoxide, bis[4-(3-maleimidephenoxy)phenyl]sulfone, bis[4-(3-maleimidephenoxy)phenyl]ether, N,N'-p-benzophenone bismaleimide, N,N'-dodecamethylenebismaleimide, N,N'-m-xylylenebismaleimide, N,N'-p-xylylenebismaleimide, N,N'-1,3-bismethylenecyclohexanebismaleimide, N,N'-1,4-bismethylenecyclohexanebismaleimide, N,N'-2,4-tolylenebismaleimide, N,N'-2,6-tolylenebismaleimide, N,N'-diphenylethanebismaleimide, N,N'-diphenyl ether bismaleimide, N,N'-(methylene-ditetrahydrophenyl)bismaleimide, N,N'-(3-ethyl)-4,4-diphenylmethanebismaleimide, N,N'-(3,3-dimethyl)-4,4-diphenylmethanebismaleimide, N,N'-(3,3-diethyl)-4,4-diphenylmethanebismaleimide, N,N'-(3,3-dichloro)-4,4-diphenylmethanebismaleimide, N,N'-tolidinebismaleimide, N,N'-isophoronebismaleimide, N,N'-p,p'diphenyldimethylsilylbismaleimide, N,N'-benzophenonebismaleimide, N,N'-diphenylpropanebismaleimide, N,N'-naphthalenebismaleimide, N,N'-4,4-(1,1-diphenyl-cyclohexane)bismaleimide, N,N'-3,5-(1,2,4-triazole) bismaleimide, N,N'-pyridine-2,6-diylbismaleimide, N,N'-5-methoxy-1,3-phenylenebismaleimide, 1,2-bis(2-maleimideethoxy)ethane, 1,3-bis(3-maleimidepropoxy)propane, N,N'-4,4-diphenylmethane-bis-dimethylmaleimide, N,N'-hexamethylene-bis-dimethylmaleimide, N,N'-4,4'-(diphenyl ether)-bis-dimethylmaleimide, N,N'-4,4'-(diphenyl sulfone)-bis-dimethylmaleimide, triethylene glycol biscarbonate bisethylmaleimide, isophorone bisurethane bisethylmaleimide, bisethylmaleimide carbonate, 4,9-dioxa-1,12dodecanebismaleimide, bispropylmaleimide, dodecaneN,N'-bismaleimide, N-(2,4,6-isopropyl-3-maleimidephenyl) maleimide, and the like.

In addition, maleimide-based compounds obtainable by the reaction of 3,4,4'-triaminodiphenylmethane, triaminophenol, and the like with maleic anhydride and maleimide-based compounds obtainable by the reaction of tris-(4-aminophenyl)-phosphate or tris-(4-aminophenyl)-thiophosphate with maleic anhydride may be also mentioned.

Moreover, examples of the fluorine-containing bismaleimide-based compounds include 2,2'-bis(4-maleimidephenyl)hexafluoropropane, 2,2'-bis[4-(3-maleimidephenoxy)phenyl]-1,1,1,3,3,3-hexafluoropropane, 2,2'-bis[4-(4-maleimidephenoxy)phenyl]-1,1,1,3,3,3-hexafluoropropane, 2,2'-bis[4-(4-maleimide-2-trifluoromethylphenoxy)phenyl]-1,1,1,3,3,3-hexafluoropropane, 2,2-bis[3,5-dimethyl-(4-maleimidephenoxy)phenyl]-1,1,1,3,3,3-hexafluoropropane, 2,2-bis[3,5-dibromo-(4-maleimidephenoxy)phenyl]-1,1,1,3,3-hexafluoropropane, 2,2-bis[3,5-dimethyl-(4-maleimidephenoxy)phenyl]-1,1,1,3,3,3-hexafluoropropane, 2,2'-bis[3-maleimide-5-(trifluoromethyl)phenyl]-1,1,1,3,3,3-hexafluoropropane, 2,2'-bis(3-fluoro-5-maleimidephenyl)-1,1,1,3,3,3-hexafluoropropane, 3,3'-bismaleimide-5,5'-bis(trifluoromethyl)biphenyl, 3,3'-difluoro-5,5'-bismaleimidebiphenyl, 3,3'-bismaleimide-5,5'-bis(trifluoromethyl)benzophenone, 3,3'-difluoro-5,5'-bismaleimidebenzophenone, 1,3-bis[3-maleimide-5-(trifluoromethyl)phenoxy]benzene, 1,4-bis[3-maleimide-5-(trifluoromethyl)phenoxy]benzene, 1,3-bis(3-fluoro-5-maleimidephenoxy)benzene, 1,4-bis(3-fluoro-5-maleimidephenoxy)benzene, 1,3-bis(3-fluorophenoxy)-5-fluorobenzene, 1,3-bis(3-fluoro-5-maleimidephenoxy)-5-fluorobenzene, 3,5-bis[3-maleimidephenoxy]benzotrifluoride, 3,5-bis[3-maleimide-5-(trifluoromethyl)phenoxy]benzotrifluoride, bis(3-fluoro-5-maleimidephenyl) ether, bis[3-maleimide-5-(trifluoromethyl)phenyl]ether, bis(3-fluoro-5-maleimidephenyl) sulfide, bis[3-maleimide-5-(trifluoromethyl)phenyl]sulfide, bis(3-fluoro-5-maleimidephenyl) sulfone, bis[3-maleimide-5-(trifluoromethyl)phenyl]sulfone, 1,3-bis(3-fluoro-5-maleimidephenyl)-1,1,3,3-tetramethyldisiloxane, 1,3-bis[3-maleimide-5-(trifluoromethyl)phenyl]-1,1,3,3-tetramethyldisiloxane, and the like.

In addition, as the maleimide-based compounds, oligomers and polymers having one or more maleimide groups are also mentioned.

The kind of the oligomers is not particularly limited and examples of the oligomers include those obtainable by Michael addition reaction of the above maleimide-based compounds with polyamines, those obtainable by the reaction of maleic acids and/or maleic anhydrides with diamines, and the like. Moreover, those obtainable by the reaction of polyimide precursors having a terminal anhydride group, obtained by reacting tetracarboxylic dianhydrides and diamines, with hydroxyl group-containing maleimide-based compounds such as maleimide-based compounds of the reaction products between epoxy resins and maleimide group-containing monocarboxylic acids, those obtainable by the reaction of polyimide precursors having a terminal anhydride group, obtained by reacting tetracarboxylic dianhydrides and diamines, with hydroxyl group-containing maleimide-based compounds such as maleimide-based compounds of the reaction products between epoxy resins and maleimide group-containing monocarboxylic acids, and also with polyol compounds, and the like may be mentioned.

Furthermore, there may be mentioned compounds obtainable by bonding one or more maleimide groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

Examples of the compound having one or more (meth)acryloyl groups include (meth)acryl esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth)acrylate, decyl (meth)acrylate, dodecyl (meth)acrylate, lauryl (meth)acrylate, lauryl-tridecyl (meth)acrylate, tridecyl (meth)acrylate, cetyl-stearyl (meth)acrylate, stearyl (meth)acrylate, cyclohexyl (meth)acrylate, benzyl (meth)acrylate, and phenyl (meth)acrylate; (meth)acrylamides such as (meth)acrylamide and methylol (meth)acrylamide; reactive acrylic monomers such as (meth)acrylic acid, hydroxyethyl (meth)acrylate, hydroxypropyl (meth)acrylate, hydroxybutyl (meth)acrylate, dimethylaminoethyl (meth)acrylate, diethylaminoethyl (meth)acrylate, butylaminoethyl (meth)acrylate, glycidyl (meth)acrylate, and tetrahydrofurfuryl (meth)

acrylate; crosslinkable acrylic monomers such as ethylene di(meth)acrylate, diethylene glycol di(meth)acrylate, triethylene glycol di(meth)acrylate, tetraethylene glycol di(meth)acrylate, decaethylene glycol di(meth)acrylate, pentadecaethylene glycol di(meth)acrylate, pentacontahectaethylene glycol di(meth)acrylate, butylene di(meth)acrylate, allyl (meth)acrylate, trimethylolpropane tri(meth)acrylate, pentaerythritol tetra(meth)acrylate, and diethylene glycol phthalate di(meth)acrylate; monofunctional (meth)acrylic compounds such as diethylene glycol-modified nonylphenol (meth)acrylate, isodecyl (meth)acrylate, lauryl (meth)acrylate, cetyl (meth)acrylate, stearyl (meth)acrylate, and 2-(2-ethoxyethoxy)2-ethylhexyl (meth)acrylate; and the like.

In addition to the above, examples of the compound having two or more (meth)acryloyl groups include 1,4-butanediol di(meth)acrylate, neopentyl glycol di(meth)acrylate, propylene oxide-modified neopentyl glycol di(meth)acrylate, neopentyl glycol hydroxypropionate di(meth)acrylate, neopentyl glycol hydroxypivalate di(meth)acrylate, 1,6-hexanediol di(meth)acrylate, 1,9-nonanediol di(meth)acrylate, tripropylene glycol di(meth)acrylate, polypropylene glycol di(meth)acrylate, trimethylolpropane tri(meth)acrylate, ethylene oxide-modified trimethylolpropane tri(meth)acrylate, propylene oxide-modified trimethylolpropane tri(meth)acrylate, propylene oxide-modified glycerin tri(meth)acrylate, pentaerythritol tri(meth)acrylate, pentaerythritol tetra(meth)acrylate, ditrimethylolpropane tetra(meth)acrylate, dipentaerythritol hexa(meth)acrylate, and isocyanuric acid ethylene oxide-modified tri(meth)acrylate; and the like.

In addition, there are mentioned isobornyl (meth)acrylate, norbornyl (meth)acrylate, dicyclopentenoxyethyl (meth)acrylate, dicyclopentenoxypropyl (meth)acrylate, etc.; (meth)acryl ester of diethylene glycol dicyclopentenyl monoether, (meth)acryl ester of oligooxyethylene or oligopropylene glycol dicyclopentenyl monoether, etc.; dicyclopentenyl cinnamate, dicyclopentenoxyethyl cinnamate, dicyclopentenoxyethyl monofumarate or difumarate, etc.; mono- or di-(meth)acrylates of 3,9-bis(1,1-bismethyl-2-oxyethyl)-spiro[5,5]undecane, 3,9-bis(1,1-bismethyl-2-oxyethyl)-2,4,8,10-tetraoxaspiro[5,5]undecane, 3,9-bis(2-oxyethyl)-spiro[5,5]undecane, 3,9-bis(2-oxyethyl)-2,4,8,10-tetraoxaspiro[5,5]undecane, etc., or mono- or di-(meth)acrylates of ethylene oxide or propylene oxide addition polymers of these spiro glycols, or methyl ethers of these mono(meth)acrylates, 1-azabicyclo[2,2,2]-3-octenyl (meth)acrylate, bicyclo[2,2,1]-5-hepten-2,3-dicarboxyl monoallyl ester, etc., dicyclopentadienyl (meth)acrylate, dicyclopentadienyloxyethyl (meth)acrylate, dihydroxydicyclopentadienyl (meth)acrylate, and the like.

In addition, oligomers and polymers having one or more (meth)acryloyl groups are also mentioned.

The kind of the oligomers is not particularly limited and examples of the oligomers include oligoethylene glycols, epoxy resin oligomers, polyester resin oligomers, polyamide resin oligomers, urethane resin oligomers, oligovinyl alcohol, phenol resin oligomers, and the like.

Specific examples thereof include acryl esters of epoxy resin oligomers (e.g., diglycidyl ether diacrylate of bisphenol A), reaction products among epoxy resin oligomers, acrylic acid, and methyltetrahydrophthalic anhydride, reaction products between epoxy resin oligomers and 2-hydroxyethyl acrylate, reaction products among epoxy resin oligomers, diglycidyl ether, and diallylamine, ring-opening copolymerization esters of glycidyl diacrylate and phthalic anhydride, esters of methacrylic acid dimer and polyols, polyesters obtainable from acrylic acid, phthalic anhydride, and propylene oxide, reaction products among oligoethylene glycols, maleic anhydride, and glycidyl methacrylate, reaction products between oligovinyl alcohols and N-methylolacrylamide, compounds obtainable by esterifying oligovinyl alcohols with succinic anhydride and then adding glycidyl methacrylate, oligomers obtainable by reacting diallyl ester of pyromellitic dianhydride with p,p'-diaminodiphenyl, reaction products between ethylene-maleic anhydride copolymers and allylamine, reaction products between methyl vinyl ether-maleic anhydride copolymers and 2-hydroxyethyl acrylate, compounds obtainable by further reacting the products with glycidyl methacrylate, urethane oligomers which have acryloyl groups or methacryloyl groups in both terminals and in which an oligooxyalkylene segment or a saturated oligoester segment or both of them are connected via a urethane bond, acryl-modified isoprene rubber or butadiene rubber at the terminals, and the like.

Moreover, specific examples of the oligomers having a (meth)acryloyl group include oligoethylene glycol di(meth)acrylate, nonylphenol EO-modified (meth)acrylate, oligopropylene glycol di(meth)acrylate, neopentyl glycol di(meth)acrylate, butylene glycol di(meth)acrylate, 1,6-hexanediol di(meth)acrylate, trimethylolpropane tri(meth)acrylate, pentaerythritol poly(meth)acrylate, bisphenol A diglycidyl ether di(meth)acrylate, oligoester (meth)acrylate, oligoester (meth)acrylate, and the like.

Moreover, there are also mentioned (meth)acryloyl group-containing silicone oligomers wherein one or more (meth)acryloyl groups or groups containing a (meth)acryloyl group are bonded to at least one terminal silicon. Examples of the structure of the silicone oligomer itself include structures containing any one or more of an alkylsiloxane structural unit having 2 or more carbon atoms, an arylsiloxane structural unit, and an aralkylsiloxane structural unit.

Furthermore, there are also mentioned compounds obtainable by bonding one or more (meth)acryloyl groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

As compounds having one or more cyclic ether structures, cyclic ether compounds having a cyclic ether structure containing 2 to 12 carbon atoms and 1 to 6 oxygen atoms, particularly one or more crosslinkage structures containing —O— are mentioned. More specifically, compounds having an epoxy ring such as a glycidyl group are mentioned.

Examples of the compound having one or more cyclic ether structures include ethylene glycol diglycidyl ether, trimethylolpropane triglycidyl ether, and the like.

Moreover, oligomers and polymers having one or more cyclic ether structures are also mentioned.

Examples of the oligomers having a cyclic ether structure include oligoethylene glycol diglycidyl ether and the like.

Furthermore, there are also mentioned compounds obtainable by bonding one or more groups having the cyclic ether structure to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

As the compound having one or more alkenyl groups, compounds having one or more vinyl groups and/or allyl groups are mentioned. As the compound having one or more alkenyl groups, for example, polyvinyl cinnamates and the like are mentioned.

Furthermore, there are also mentioned compounds obtainable by bonding one or more alkenyl groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

Examples of the compound having one or more vinylene groups include compounds having an ethylenically unsaturated double bond, unsaturated polyesters, and the like. Moreover, as the compound having one or more vinylene groups, compounds having one or more cinnamyl groups ($C_6H_5$—CH=CH—$CH_2$—) or cinnamylidene groups ($C_6H_5$—CH=CH—CH=) are also mentioned. As such compounds, for example, polyvinyl cinnamate is mentioned. Polyvinyl cinnamate can be obtained by reacting polyvinyl alcohol with $C_6H_5$—CH=CH—$CH_2$—COCl.

Furthermore, there are also mentioned compounds obtainable by bonding one or more vinylene groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

Examples of the compound having one or more styryl groups include styrene, α-methylstyrene, p-methylstyrene, α-methyl-p-methylstyrene, p-methoxystyrene, o-methoxystyrene, 2,4-dimethylstyrene, chlorostyrene, bromostyrene, and the like. Also, polyvinylbenzalacetophenones, polyvinylstyrylpyridines, and the like are mentioned.

Furthermore, there are also mentioned compounds obtainable by bonding one or more styryl groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

Examples of the compound having one or more azido groups include 2,6-bis(4-azidobenzylidene)cyclohexanone, 2,6-bis(4'-azidobenzyl)methylcyclohexanone, and the like.

Furthermore, there are also mentioned compounds obtainable by bonding one or more azido groups to polymer components or oligomer components such as urethane resins, epoxy resins, polyester resins, polyether resins, alkyd resins, polyvinyl chloride resins, fluorocarbon resins, silicone resins, vinyl acetate resins, phenol resins, polyamide resins, and modified resins of two or more of them.

Moreover, as a monomer copolymerizable with the above monomers, cyano group-containing vinyl compounds such as acrylonitrile and methacrylonitrile; halogen-containing vinyl compounds such as vinyl chloride and vinylidene chloride; organic acid group-containing vinyl compounds such as vinyl acetate and vinyl propionate; reactive monomers such as ethylene, maleic acid and itaconic acid; acryl-modified silicones; crosslinking copolymerization monomers such as chloroethyl vinyl ether, allyl glycidyl ether, ethylidenenorbornene, divinylbenzene, triallyl cyanurate, and triallyl isocyanurate; and the like.

The above polymerization precursor may be used singly or as a mixture of two or more of them.

Furthermore, it is also possible to change the composition of the resulting polymer, for example, in the direction of the film thickness or in the direction perpendicular to the surface of the base material by changing the composition of the polymerization precursor to be polymerized during the polymerization, and the like.

In the case of polymerizing a polymerization precursor other than spontaneously photopolymerizable compounds, a photopolymerization initiator is necessary. The photopolymerization initiator is not particularly limited as far as it dissolves in the supercritical fluid or subcritical fluid or the polymerization precursor, and can be suitably determined depending on the supercritical fluid or subcritical fluid and the polymerization precursor to be used, and the like.

Examples of the photopolymerization initiator include azo initiators such as dialkyl (2,2'-azobisisobutyrate), e.g., dimethyl (2,2'-azobisisobutyrate) and diethyl (2,2'-azobisisobutyrate), 2,2'-azobis(isobutyronitrile)(AIBN), 2,2'-azobis(2-methylbutyronitrile), and 2,2'-azobis(2,4-dimethylvaleronitrile); peroxide initiators such as tert-butyl hydroperoxide, cumene hydroperoxide, tert-butyl peroxyneodecanoate, tert-butyl peroxypivalate, tert-hexyl peroxy-2-ethylhexanoate, methyl ethyl ketone peroxide, acetyl cyclohexylsulfonyl peroxide, lauroyl peroxide, and benzoyl peroxide; and the like.

Examples of the other photopolymerization initiator include benzoin, benzoin alkyl ethers such as benzoin ethyl ether, benzoin-n-propyl ether and benzoin isbutyl ether; 2,2-dimethoxy-2-phenylacetophenone, 2-benzyl-2-dimethylamino-1-(4-morpholinophenyl)-butan-1-one, 1-hydroxycyclohexyl phenyl ketone, diacetyl, diphenyl sulfide, eosin, thionine, 9,10-anthraquinone, 2-ethyl-9,10-anthraquinone, and the like.

As the photopolymerization initiator, there are further mentioned aromatic carbonyl compounds such as benzophenone, benzoin methyl ether, benzoin isopropyl ether, benzil, xanthone, thioxanthone, and anthraquinone; acetophenones such as acetophenone, propiophenone, α-hydroxyisobutyrophenone, α,α'-dichloro-4-phenoxyacetophenone, 1-hydroxy-1-cyclohexylacetophenone, and acetophenone; organic peroxides such as benzoyl peroxide, tert-butylperoxybenzoate, tert-butyl-peroxy-2-ethylhexanoate, tert-butyl hydroperoxide, di-tert-butyl diperoxyisophthalate, and 3,3',4,4'-tetra(tert-butylperoxycarbonyl)benzophenone; diphenyl halonium salts such as diphenyliodonium bromide and diphenyliodonium chloride; organic halides such as carbon tetrachloride, carbon tetrabromide, chloroform, and iodoform; heterocyclic and polycyclic compounds such as 3-phenyl-5-isoxazolone and 2,4,6-tris(trichloromethyl)-1,3,5-triazinebenzanthrone; azo compounds such as 2,2'-azobis(2,4-dimethylvaleronitrile), 2,2'-azobisisobutyronitrile, 1,1'-azobis(cyclohexane-1-carbonitrile), and 2,2'-azobis(2-methylbutyronitrile); iron-arene complexes described in European Patent No. 152377; titanocene compounds described in Japanese Patent Application Laid-open No. 63-221110; and the like.

The above photopolymerization initiator may be used singly or as a mixture of two or more of them.

The using amount of the photopolymerization initiator can be suitably determined and can be, for example, about 0.1 to 30 parts by weight relative to 100 parts by weight of the polymerization precursor.

Also, if necessary, the above photopolymerization initiator can be used in combination with a photopolymerization initiating auxiliary (sensitizer). Examples of the photopolymerization initiating auxiliary include 2-dimethylaminoethyl benzoate, N,N'-dimethylaminoethyl methacrylate, isoamyl p-dimethylaminobenzoate, and ethyl p-dimethylaminobenzoate; and the like.

In the invention, a spectral sensitizer which may interact with the polymer to be produced or the photopolymerization initiator can be used. Examples of the spectral sensitizer include thioxanthene-based, xanthene-based, ketone-based, thiopyrylium salt-based, base styryl-based, merocyanine-based, 3-substituted coumarin-based, cyanine-based, acridine-based, thiazine-based, and the like pigments. In this connection, the "interaction" herein includes energy transfer and electron transfer from an excited spectral sensitizer to the polymer to be produced and/or the photopolymerization initiator.

The following will describe one embodiment of the method of producing a polymer of the invention with reference to the Drawing. FIG. 1 illustrates a schematic constitutional drawing of one example of production apparatus. 1 is a carbon dioxide cylinder, 2 is a pump for carbon dioxide supply, 3 is a reactor capable of maintaining a high temperature and high pressure state, 4 is a temperature-controlling means, 5 is a window for the incidence of an activation energy ray (e.g., quartz window), 5' is a window (e.g., quartz window), 6 is a light source, 7 is a pressure-reducing valve, 8 is a base material through which an activation energy ray can be transmitted (activation energy ray-transmittable base material), 9 is a magnetic stirrer, and 10 is a stirring bar (rotor). In this connection, the window 5' is not necessarily provided.

First, the activation energy ray-transmittable base material 8 is placed inside the activation energy ray-transmittable window 5 set up at the reactor 3. The activation energy ray-transmittable base material 8 is placed so that the surface at the side of the window 5 which is a surface thereof through which the activation energy ray is incident is not exposed to the supercritical carbon dioxide or subcritical carbon dioxide and another surface thereof through which the activation energy ray is outgoing is exposed to the supercritical carbon dioxide or subcritical carbon dioxide at the polymerization reaction. The activation energy ray-transmittable base material 8 is not necessarily placed so as to be contact with the window 5 and a placing member such as an activation energy ray-transmittable film can intervenes between them.

The method for fixing the activation energy ray-transmittable base material 8 is not particularly limited, and examples thereof include a method of providing the window at the bottom of a concave portion of the reactor wall and pushing the base material thereinto to adhere it closely to the window, a method of fitting the base material to the window frame with a fastener, and the like method. Alternatively, it is also possible that the window is constituted as a removable one and the window itself is used as a base material.

The base material is not particularly limited as far as it transmits an activation energy ray, and examples thereof include transparent resins or translucent resins, transparent or translucent glass, metal oxides such as ITO (indium-tin oxide), metals, and the like. The material of the base material is selected in consideration of the composition of the polymer film to be formed and the like. For example, in the case of forming a bismaleimide-based polymer film, when the base material is quartz glass, the adhesiveness of the polymer film to be formed is low and hence it is easy to peel it off. On the other hand, when the base material is a PET (polyethylene terephthalate) film, a polymer film having a high adhesiveness is formed. In addition, a base material coated with a coating material such as polyvinyl alcohol (PVA) can be used.

As the base material, the material having any shape can be used. The polymerization precursor dissolved in the supercritical fluid or subcritical fluid polymerizes in a state of being homogeneously distributed on the interface of the base material to form a polymer film. Therefore, it is possible to form a polymer film uniformly even on the base material having a fine concavo-convex structure or a deep concavo-convex structure.

Moreover, with regard to the window 5 for the incidence of the activation energy ray on which the base material 8 is placed or the placing member to be set up thereon, the shape of them can be determined according to the shape of the base material for forming the polymer film or the desired shape of the polymer film.

After the activation energy ray-transmittable base material 8 is placed inside the reactor 3, a polymerization precursor and, if necessary, a photopolymerization initiator are charged into the reactor 3. In the case that the polymerization precursor is liquid, the polymerization precursor and, if necessary, the photopolymerization initiator can be supplied from their reservoir(s) to the reactor 3 by a pump. The polymerization precursor and the photopolymerization initiator can be supplied to the reactor 3 after adjusting their temperature to polymerization temperature beforehand by a heater.

On the other hand, carbon dioxide is supplied from the carbon dioxide cylinder 1 to the reactor 3 by the pump 2. Carbon dioxide can be supplied to the reactor 3 after regulating its temperature to polymerization temperature beforehand by a heater.

The pressure in the reactor 3 is regulated to polymerization pressure by the amount of carbon dioxide supplied. On the other hand, the temperature in the reactor 3 is regulated to polymerization temperature by the temperature-controlling means 4 such as a heater. The regulation of the pressure in the reactor 3 and the regulation of the temperature in the reactor 3 can be carried out simultaneously, or either of them may be first regulated and then the other may be regulated.

In the case that the polymerization precursor and carbon dioxide whose temperature is regulated to polymerization temperature or higher temperature beforehand by a heater are supplied to the reactor 3, the temperature-controlling means 4 such as a heater is not necessarily provided as far as the temperature in the reactor 3 can be maintained to polymerization temperature during the polymerization reaction.

After the inside of the reactor 3 are maintained at predetermined pressure and temperature, a photopolymerization reaction is carried out by irradiating the inside of the reactor 3 with an activation energy ray through the activation energy ray transmittable window 5 and the base material 8 from the light source 6 with stirring the inside of the reactor by the magnetic stirrer 9 and the stirring bar 10, whereby a polymer film is formed on the activation energy ray outgoing surface of the activation energy ray-transmittable base material. The activation energy ray may be applied as continuous irradiation or as intermittent irradiation. By controlling the dose of the activation energy ray, it is possible to control the thickness of the polymer film to be formed.

In this connection, the stirring means for stirring the inside of the reactor is not limited to the magnetic stirrer 9 and the stirring bar 10.

Moreover, according to the invention, the polymer film can be selectively formed on the activation energy ray-transmitted part of the activation energy ray outgoing surface of the base material. For example, by irradiation with an activation energy ray through a mask pattern, a polymer film having a desired pattern can be formed. In this case, for example, it is possible to put a mask pattern on the outside of the window 5 or to make the shape of the window itself a predetermined pattern shape.

Furthermore, by using a laser beam as a light source, a polymer film having a fine pattern can be formed since the light-irradiated area can be further focused as compared with the other light sources. Also, by using a laser beam as a light source, irradiation with more highly intense light can be achieved as compared with the other light sources and hence the density and the aspect (ratio of the height to the diameter of the furry protrusion) of the furry protrusion of the polymer containing the furry protrusion can be more easily controlled.

After the completion of the polymerization reaction, carbon dioxide is released by the pressure-reducing valve 7 and the pressure in the reactor 3 is reduced to around atmospheric pressure. In order to remove the unreacted polymerization precursor and the like and to obtain more highly pure polymer, the pressure in the reactor 3 may be reduced to a pressure lower than atmospheric pressure, for example, a vacuum of 133 Pa or lower and then be raised to around atmospheric pressure. After cooling the temperature in the reactor 3 to about room temperature, the base material 8 on which a polymer film has been formed is taken out of the reactor 3.

After the completion of the polymerization reaction, the polymer produced can be expanded by rapidly reducing the pressure from a high pressure state, i.e., a supercritical sate or a subcritical state or by rapidly cooling the temperature and rapidly reducing the pressure from a high temperature and high pressure state. A supercritical fluid or subcritical fluid has a strong permeability into a polymer and is homogeneous, a uniform porous substance can be formed by carrying out such a treatment.

At that time, the cooling rate of the polymer and the pressure-reducing rate of the polymer can be suitably determined. It is possible to control the pore size by controlling the cooling rate of the polymer and the pressure-reducing rate of the polymer. There is a tendency that faster cooling rate of the polymer and faster pressure-reducing rate of the polymer result in larger pore size.

In this connection, after the polymerization, according to need, the polymer may be left in the supercritical fluid or subcritical fluid for a predetermined time and then rapid reduction of the pressure or rapid cooling and rapid reduction of the pressure may be carried out to expand the polymer.

The polymer film formed on the base material which has been taken out of the reactor 3 can be post-cured by irradiation with an electromagnetic wave, irradiation with a light or heating, or by the combination thereof.

Carbon dioxide released from the inside of the reactor 3 after the completion of the polymerization reaction can be recovered and re-used.

Although the above polymerization steps are described as batch-wise, the polymerization can be also carried out continuously or semi-continuously.

The shape of the reactor for use in carrying out the method of producing a polymer of the invention is not limited to the one illustrated in FIG. 1. For example, a constitution wherein an optical system such as an optical fiber is inserted into the reactor is possible, where an activation energy ray can be applied to the inside of the reactor through the optical system.

Furthermore, by suitably selecting the polymerization conditions of the dose of the activation energy ray and the like, a polymer containing a furry protrusion can be also formed on the base material. In this case, the polymer grows along the direction of irradiation with the activation energy ray, whereby the furry protrusion of the polymer is formed. That is, the polymer usually grows in the direction perpendicular to the base material surface, whereby the furry protrusion of the polymer is formed. Usually, there is a tendency that the polymer to be produced changes from the polymer containing the furry protrusion into a continuous film, when the irradiation time with the activation energy ray (polymerization time) is lengthened.

According to the invention, there can be produced a polymer having a furry protrusion whose height is 0.1 time or more as much as the diameter, or a polymer having a furry protrusion whose height is 1 time or more as much as the diameter, or a polymer having a furry protrusion whose height is 2 times or more as much as the diameter, or a polymer having a furry protrusion whose height is 3 times or more as much as the diameter, or further a polymer having a furry protrusion whose height is 5 times or more as much as the diameter. The upper limit of the ratio of the height to the diameter of the furry protrusion is not particularly limited but, for example, the height of the furry protrusion can be 50 times as much as the diameter.

Moreover, according to the invention, there can be produced a polymer having a furry protrusion whose height is 10 nm or more, or a polymer having a furry protrusion whose height is 0.5 μm or more, or a polymer having a furry protrusion whose height is 1 μm or more, or a polymer having a furry protrusion whose height is 5 μm or more, or a polymer having a furry protrusion whose height is 10 μm or more, or a polymer having a furry protrusion whose height is 30 μm or more, or further a polymer having a furry protrusion whose height is 50 μm or more. The upper limit of the height of the furry protrusion is not particularly limited but, for example, the height of the furry protrusion can be 500 μm.

The height of the furry protrusion of the polymer can be controlled by the dose of the activation energy ray (integrating amount of light). The height of the furry protrusion of the polymer is nearly proportional to the dose of the activation energy ray, but there is a tendency that the height of the furry protrusion of the polymer no longer increases and the distance between the furry protrusions is narrowed to form a continuous film when the dose of the activation energy ray reaches a certain amount or more.

In particular, according to the invention, there can be produced a polymer having a furry protrusion whose height is 0.1 time or more as much as the diameter and is 10 nm or more, or a polymer having a furry protrusion whose height is 1 time or more as much as the diameter and is 1 μm or more, or further a polymer having a furry protrusion whose height is 5 times or more as much as the diameter and is 50 μm or more. The polymer having a furry protrusion whose height is large to the diameter and is high is hitherto not obtained by polymerizing a polymerization precursor such as a monomer.

The surface density of the furry protrusions of the polymer containing the furry protrusion is not particularly limited but, according to the invention, it is possible to form a polymer containing the furry protrusions having a high furry protrusion surface density of, for example, 0.01 piece/nm$^2$ or higher, further 0.1 piece/nm$^2$ or higher on the base material. Moreover, it is also possible to reduce the density of the furry protrusions of the polymer containing the furry protrusion and the furry protrusion surface density can be controlled to be, for example, 0.001 piece/μm$^2$.

Herein, in the case that the polymer containing the furry protrusion is a protruding polymer, the surface density of the furry protrusions means the density of the protruding polymer on the surface of the base material.

According to the invention, the polymer film or the polymer containing the furry protrusion can be formed on the base material at the same time as the polymerization reaction is carried out. Moreover, as mentioned above, depending on the base material selected, the polymer film or the polymer containing the furry protrusion to be formed can be easily peeled off from the base material, so that the product can be obtained, for example, as a resin film (including the one having one or more furry protrusions).

In addition, according to the invention, it is possible to form the polymer film or the polymer containing the furry protrusion uniformly even on the base material having a fine concavo-convex structure or a deep concavo-convex structure. For example, according to the invention, it is possible to coat the inside of a minute reactor having a diameter of several dozen μm, which is called a microreactor.

Moreover, it is also possible to form a polymer film or a polymer containing a furry protrusion, in which nano particles or the other additive is homogeneously dispersed. For example, a colored film or a fluorescent film can be formed.

Furthermore, according to the invention, the polymer film or the polymer containing the furry protrusion can be selectively formed on an activation energy ray-transmitted part of the activation energy ray outgoing surface of a base material. Therefore, it is possible to form a polymer film having a desired fine pattern or a furry protrusion-containing polymer having a desired fine pattern. For example, the invention can be applied to the formation of a resist film for use in patterning of ITO.

In addition, the polymer film formed by photopolymerization of the maleimide-based compound represented by the above general formula (1) can be used as a covering layer of an optical element, a protective film of an optical recording media, and the like.

Furthermore, the maleimide-based polymer film can be used as an insulating film for semiconductor devices and wiring boards, a moisture-resistant protective film, a flexible printed board, and the like.

In the case that polymer fine particles are produced according to the method of the invention, when the polymer adheres to the window for the incidence of the activation energy ray, which is set up at the reactor, to inhibit the formation of the particles, it is effective to carry out the photopolymerization reaction with placing a fluorocarbon resin film inside the window.

The invention can be also applied to the process for forming a three-dimensional structure by photopolymerization utilizing two-photon absorption using the femtosecond laser described in S. Kawata et al., Nature, 412, 697 (2001), the process for forming a fiber structure by photopolymerization utilizing one-photon absorption using the femtosecond laser described in S. Shoji and S. Kawata, Appl. Phys. Lett., 75, 737 (1999), and the process for forming a three-dimensional photonic crystal structure by photopolymerization utilizing the interference light described in S. Shoji and S. Kawata, Appl. Phys. Lett., 76, 2668 (2000). By carrying out the above processes in a supercritical fluid or in a subcritical fluid, the influence of liquid fluctuation and the influence of viscosity can be reduced to form more fine structures as compared with the case of carrying out the processes in a liquid monomer.

EXAMPLES

The following will describe the invention in more detail with reference to Examples. However, the invention is not limited to these Examples.

Example 1

Into a 30 $cm^3$-volume pressure-resistant reactor having a quartz pressure-resistant window at the bottom of a concave portion provided at the inner wall of the reactor was charged 1.5 g of a polyether bismaleimide acetate (MIA-200 manufactured by Dainippon Ink & Chemicals, Incorporated) as a polymerization precursor. Then, carbon dioxide was introduced into the reactor with a cylinder pressure (about 7 MPa) under stirring of the inside of the reactor. Thereafter, the temperature was raised to 35° C. and carbon dioxide was further introduced by means of a pressure pump so that the pressure in the reactor reached 30 MPa, whereby a supercritical state was achieved. The charged concentration of the polyether bismaleimide acetate as a polymerization precursor was 2% by weight.

After one hour of stirring under a pressure of 30 MPa at a temperature of 37° C., the inside of the reactor was irradiated with an ultraviolet ray through the quartz pressure-resistant window from the outside of the reactor so that the dose reached 5.7 $J/cm^2$, using an ultrahigh pressure mercury lamp fitted with a quartz fiber as a light source. At that time, the irradiation with the ultraviolet ray was carried out under conditions of an irradiation intensity of 38 $mW/cm^2$ and an irradiation time of 151 seconds. The wavelength of the ultraviolet ray for the irradiation was in the range of 254 to 436 nm. As a result, a polymer film was formed on the quartz pressure-resistant window.

After the irradiation with the ultraviolet ray, carbon dioxide was gradually released to the outside of the reactor over a period of 120 minutes to reduce the pressure in the reactor to atmospheric pressure. It was possible to peel off the polymer film formed on the quartz pressure-resistant window easily.

Example 2

A PET film as a base material was pushed into the concave portion provided at the inner wall of the reactor, and was closely adhered and fixed to the quartz pressure-resistant window. Then, photopolymerization was carried out in the same way as Example 1, whereby a polymer film was formed on the PET film. The polymer film formed on the PET film adhered tightly to the PET film and it was impossible to peel it off easily.

Example 3

A mask pattern was put on the outside of the quartz pressure-resistant window and photopolymerization was carried out in the same way as Example 1 except that the inside of the reactor was irradiated with the ultraviolet ray through the mask pattern, whereby a polymer film to which the mask pattern was transferred was formed on the ultraviolet ray-transmitted part of the quartz pressure-resistant window.

Example 4

After photopolymerization was carried out in the same way as Example 1, carbon dioxide was rapidly released to the outside of the reactor over a period of 10 minutes to reduce the pressure in the reactor to atmospheric pressure. When observed by an optical microscope, the resulting polymer film was found to be porous.

Comparative Example 1

Photopolymerization was carried out in the same way as Example 1 except that the polymerization temperature was 18° C. and the polymerization pressure was 4 MPa, but no polymer film was formed on the quartz pressure-resistant window. In this case, carbon dioxide during the irradiation with the ultraviolet ray was in a liquid state.

Comparative Example 2

Photopolymerization was carried out in the same way as Example 1 except that acetone was used as a polymerization solvent, but no polymer film was formed on the quartz pressure-resistant window.

Example 5

Photopolymerization was carried out in the same way as Example 1 except that 4.095 g of methyl methacrylate was used as a polymerization precursor and 0.123 g of 2-benzyl-2-dimethylamino-1-(4-morpholinophenyl)-butan-1-one and 0.123 g of 1-hydroxycyclohexyl phenyl ketone were used as photopolymerization initiators, whereby polymer fine particles were formed in the reactor. In this case, the charged concentration of the methyl methacrylate as the polymerization precursor was 15% by weight.

Example 6

Into a 30 cm$^3$-volume pressure-resistant reactor having a quartz pressure-resistant window at the bottom of a concave portion provided at the inner wall of the reactor was charged 0.872 g of a polyether bismaleimide acetate (MIA-200 manufactured by Dainippon Ink & Chemicals, Incorporated) as a polymerization precursor. Then, carbon dioxide was introduced into the reactor with a cylinder pressure (about 7 MPa) under stirring of the inside of the reactor. Thereafter, the temperature was raised to 35° C. and carbon dioxide was further introduced by means of a pressure pump so that the pressure in the reactor reached 30 MPa, whereby a supercritical state was achieved. The charged concentration of the polyether bismaleimide acetate as a polymerization precursor was 3.5% by weight.

After one hour of stirring under a pressure of 30 MPa at a temperature of 35° C., the inside of the reactor was irradiated with an ultraviolet ray through the quartz pressure-resistant window from the outside of the reactor so that the dose reached 1 J/cm$^2$, using an ultrahigh pressure mercury lamp fitted with a quartz fiber as a light source. At that time, the irradiation with the ultraviolet ray was carried out under conditions of an irradiation intensity of 33 mW/cm$^2$ and an irradiation time of 30.3 seconds. The wavelength of the ultraviolet ray for the irradiation was in the range of 254 to 436 nm. As a result, a polymer containing a furry protrusion which grew in the direction of irradiation with the ultraviolet ray, i.e., in the direction perpendicular to the surface of the base material was formed on the quartz pressure-resistant window.

After the irradiation with the ultraviolet ray, carbon dioxide was gradually released to the outside of the reactor over a period of 120 minutes to reduce the pressure in the reactor to atmospheric pressure.

Figure 2:
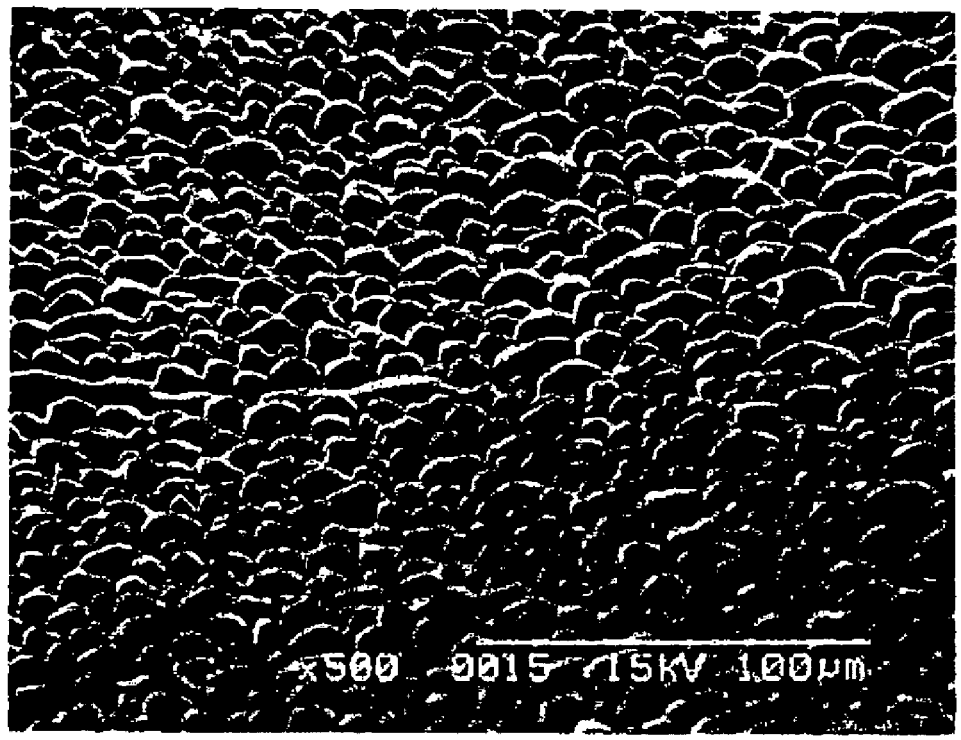
FIG. 2 is a SEM photograph of the polymer containing the furry protrusion obtained in Example 6.

FIG. 2 illustrates a SEM photograph of the resulting polymer containing the furry protrusion.

Example 7

Photopolymerization was carried out in the same way as Example 6 except that the irradiation with the ultraviolet ray was carried out under conditions of an irradiation intensity of 33 mW/cm$^2$ and an irradiation time of 152 seconds and the dose of the ultraviolet ray was 5 J/cm$^2$, whereby a polymer containing a furry protrusion which grew in the direction of irradiation with the ultraviolet ray, i.e., in the direction perpendicular to the surface of the base material was formed on the quartz pressure-resistant window.

Figure 3:
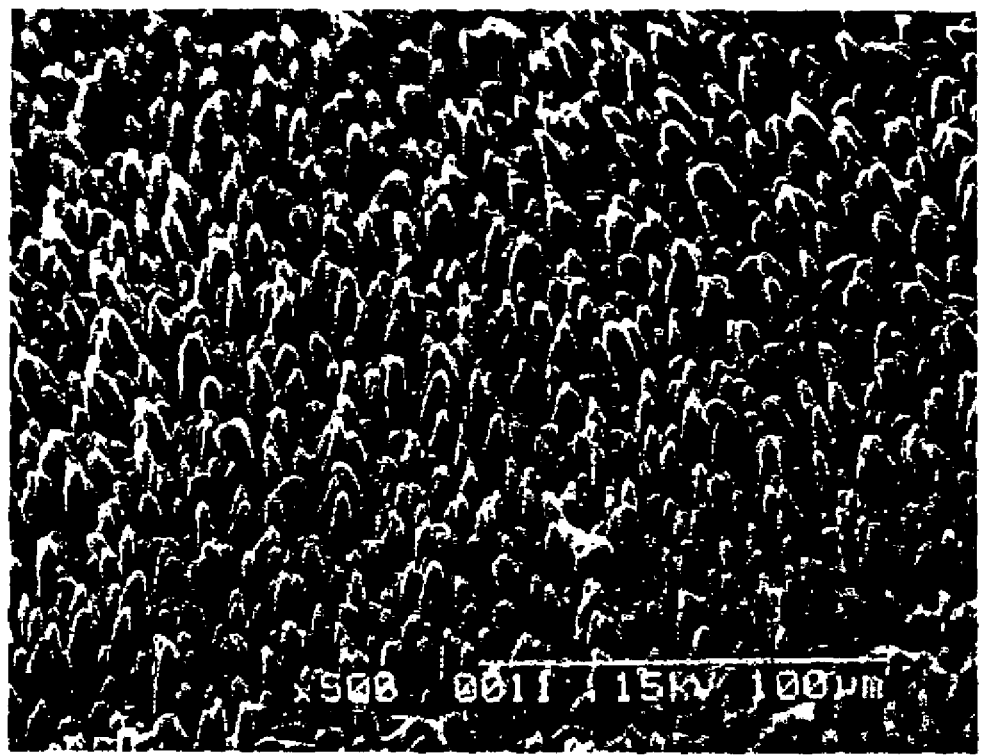
FIG. 3 is a SEM photograph of the polymer containing the furry protrusion obtained in Example 7.

FIG. 3 illustrates a SEM photograph of the resulting polymer containing the furry protrusion.

Example 8

Photopolymerization was carried out in the same way as Example 6 except that the irradiation with the ultraviolet ray was carried out under conditions of an irradiation intensity of 33 mW/cm$^2$ and an irradiation time of 303 seconds and the dose of the ultraviolet ray was 10 J/cm$^2$, whereby a polymer containing a furry protrusion which grew in the direction of irradiation with the ultraviolet ray, i.e., in the direction perpendicular to the surface of the base material was formed on the quartz pressure-resistant window.

Figure 4:
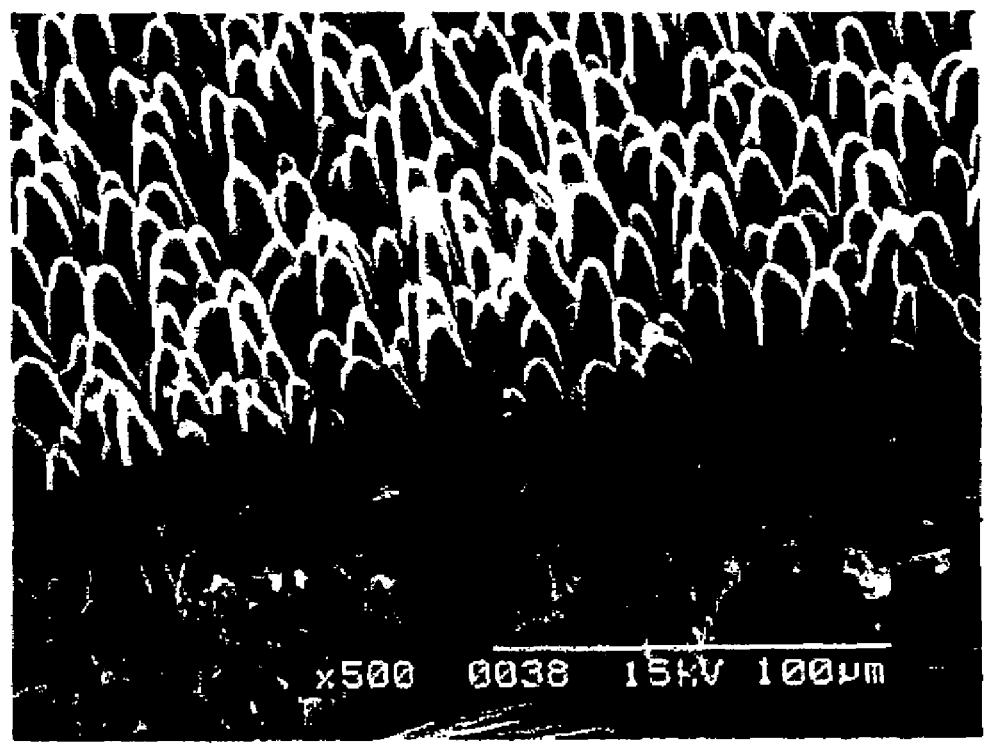
FIG. 4 is a SEM photograph of the polymer containing the furry protrusion obtained in Example 8.

FIG. 4 illustrates a SEM photograph of the resulting polymer containing the furry protrusion.

Example 9

Photopolymerization was carried out in the same way as Example 6 except that the irradiation with the ultraviolet ray was carried out under conditions of an irradiation intensity of 33 mW/cm$^2$ and an irradiation time of 1515 seconds and the dose of the ultraviolet ray was 50 J/cm$^2$, whereby a polymer film was formed on the quartz pressure-resistant window.

Figure 5:
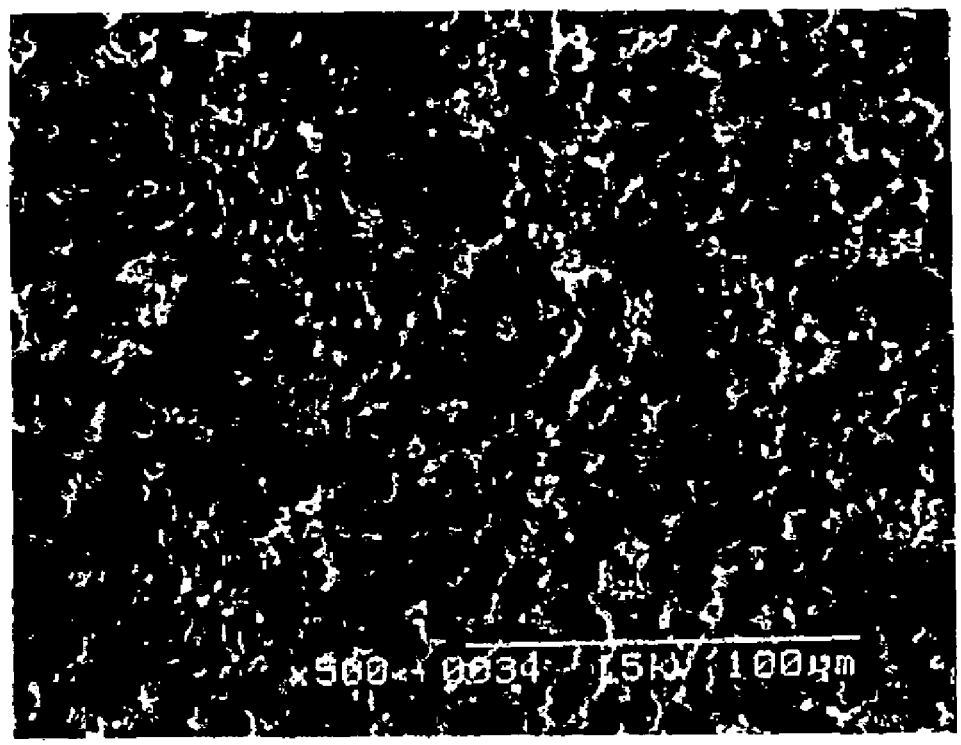
FIG. 5 is a SEM photograph of the polymer film obtained in Example 9.
Figure 6:
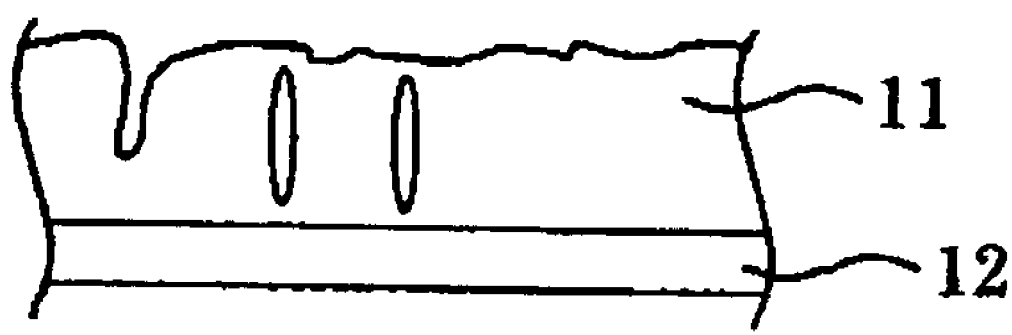
FIG. 6 is a pattern sectional view of the polymer film obtained in Example 9.

FIG. 5 illustrates a SEM photograph of the resulting polymer film. In addition, FIG. 6 illustrates a pattern sectional view of the resulting polymer film. 11 is a base material (quartz pressure-resistant window) and 12 is a polymer film. In the polymer film obtained in Example 9, the conversion into a porous continuous film had proceeded as compared with the polymer containing the furry protrusion obtained in Example 8.

Example 10

A mask pattern was put on the outside of the quartz pressure-resistant window and photopolymerization was carried out in the same way as Example 8 except that the inside of the reactor was irradiated with the ultraviolet ray through the mask pattern, whereby a polymer containing a furry protrusion to which the mask pattern was transferred was formed on the ultraviolet ray-transmitted part of the quartz pressure-resistant window.

INDUSTRIAL APPLICABILITY

According to the present invention, a polymerization precursor is photopolymerized in a supercritical fluid or in a subcritical fluid, whereby, for example, a polymer film or a polymer containing a furry protrusion can be produced. Furthermore, by irradiation of a base material with an activation energy ray through a mask pattern and transmitting the ray, the polymer film or the polymer containing the furry protrusion can be selectively formed on the activation energy ray-transmitted part of the activation energy ray outgoing surface of the base material.

What is claimed is:

1. A method of producing a polymer comprising a step of photopolymerizing one or more photopolymerizable polymerization precursors on an activation energy ray-transmittable base material by irradiation with an activation energy ray in a supercritical fluid or in a subcritical fluid, said activation energy ray-transmittable base material being exposed to the supercritical fluid or subcritical fluid.

2. The method of producing a polymer according to claim 1, wherein the supercritical fluid or subcritical fluid is supercritical carbon dioxide or subcritical carbon dioxide.

3. The method of producing a polymer according to claim 1, wherein the supercritical fluid or subcritical fluid is carbon dioxide and the photopolymerizable polymerization precursor is photopolymerized in the carbon dioxide under a pressure of 5 MPa or higher at a temperature of 20° C. or higher.

4. The method of producing a polymer according to claim 1, wherein the supercritical fluid or subcritical fluid is carbon dioxide and the photopolymerizable polymerization precursor is photopolymerized in the carbon dioxide under a pressure of 7 MPa or higher at a temperature of 30° C. or higher.

5. The method of producing a polymer according to claim 1, wherein the photopolymerizing step is conducted in the absence of a photopolymerization initiator.

6. The method of producing a polymer according to claim 1, wherein the photopolymerizable polymerization precursor has at least one maleimide group at the terminal.

7. The method of producing a polymer according to claim 1, wherein the activation energy ray is an ultraviolet ray, a visible light ray, or a near-infrared ray.

8. The method of producing a polymer according to claim 1, wherein the polymer to be produced is a film.

9. The method of producing a polymer according to claim 1, wherein the photopolymerizable polymerization precursor is represented by formula (1):

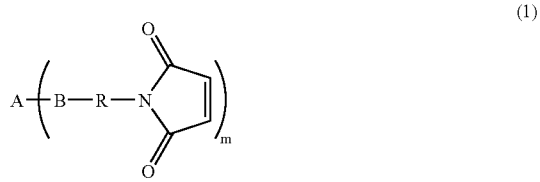

wherein A represents a hydrocarbon group optionally having a substituent, or a (poly)ether connecting chain or a (poly)ether residue, (poly)ester connecting chain or a (poly)ester residue, (poly)urethane connecting chain or a (poly)urethane residue, or a (poly)carbonate connecting chain or (poly)carbonate residue having a molecular weight of 40 to 100,000 to which a hydrocarbon group optionally having a substituent is bonded via at least one bond selected from the group consisting of an ether bond, an ester bond, a urethane bond, and a carbonate bond; B represents an ether bond, an ester bond, urethane bond, or a carbonate bond; R represents a hydrocarbon group optionally having a substituent; and m represents an integer of 1 to 6; provided that all of B or R are not necessarily the same and two or more kinds of B or R may be present when m is an integer of 2 or larger.

10. The method of producing a polymer according to claim 9, wherein in formula (1), R is an alkylene group having 1 to 5 carbon atoms, B is an ester bond represented by —COO— or —OCO—, A is a (poly)ether connecting chain or (poly)ether residue (A-1) having a molecular weight of 100 to 1,000 which comprises repeating units containing a linear alkylene group having 2 to 6 carbon atoms, a branched alkylene group having 2 to 6 carbon atoms, or a hydroxyl group-containing alkylene group having 2 to 6 carbon atoms.

11. The method of producing a polymer according to claim 10, wherein the photopolymerizable polymerization precursor is represented by formula (2):

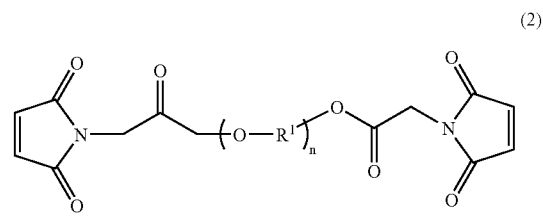

wherein $R^1$ represents an alkylene group and n is an integer of 1 to 1,000.

12. The method of producing a polymer according to claim 1, wherein the photopolymerizing step is conducted in the presence of photopolymerization initiator.

13. The method of producing a polymer according to claim 12, wherein the photopolymerization initiator is selected from the group consisting of azo initiators and peroxide initiators.

14. A method of producing a polymer comprising a step of photopolymerizing one or more photopolymerizable polymerization precursors by irradiation with an activation energy ray in a supercritical fluid or in a subcritical fluid, wherein the polymer to be produced is a film formed on an activation energy ray-transmittable base material which is placed so as to be exposed to the supercritical fluid or subcritical fluid.

15. The method of producing a polymer according to claim 14, wherein one or more photopolymerizable polymerization precursors are irradiated with an activation energy ray through the activation energy ray-transmittable base material which is placed so that a surface thereof through which the activation energy ray is incident is not exposed to the supercritical fluid or subcritical fluid and another surface thereof through which the activation energy ray is outgoing is exposed to the supercritical fluid or subcritical fluid, to photopolymerize the one or more polymerization precursors, whereby the polymer film is formed on the activation energy ray outgoing surface of the activation energy ray-transmittable base material.

16. The method of producing a polymer according to claim 15, wherein the activation energy ray-transmittable base material is irradiated with the activation energy ray through a mask pattern to selectively form the polymer film on an activation energy ray-transmitted part of the activation energy ray outgoing surface of the activation energy ray-transmittable base material.

17. A method of producing a polymer comprising a step of photopolymerizing one or more photopolymerizable polymerization precursors by irradiation with an activation energy ray in a supercritical fluid or in a subcritical fluid, wherein the polymer to be produced is a polymer containing a furry protrusion.

18. The method of producing a polymer according to claim 17, wherein the height of the furry protrusion of the polymer to be produced is 0.1 time or more as much as the diameter of the furry protrusion.

19. The method of producing a polymer according to claim 17, wherein the height of the furry protrusion of the polymer to be produced is 10 nm or more.

20. The method of producing a polymer according to claim 17, wherein the polymer containing the furry protrusion is formed on the activation energy ray-transmittable base material which is placed so as to be exposed to the supercritical fluid or subcritical fluid.

21. The method of producing a polymer according to claim 20, wherein one or more photopolymerizable polymerization precursors are irradiated with an activation energy ray through the activation energy ray-transmittable base material which is placed so that a surface thereof through which the activation energy ray is incident is not exposed to the supercritical fluid or subcritical fluid and another surface thereof through which the activation energy ray is outgoing is exposed to the supercritical fluid or subcritical fluid, to photopolymerize the one or more polymerization precursors, whereby the polymer containing the furry protrusion is formed on the activation energy ray outgoing surface of the activation energy ray-transmittable base material.

22. The method of producing a polymer according to claim 21, wherein the activation energy ray-transmittable base material is irradiated with the activation energy ray through a mask pattern to selectively form the polymer containing the furry protrusion on an activation energy ray-transmitted part of the activation energy ray outgoing surface of the activation energy ray-transmittable base material.

23. A method of producing a polymer comprising a step of photopolymerizing one or more photopolymerizable polymerization precursors by irradiation with an activation energy ray in a supercritical fluid or in a subcritical fluid, wherein the supercritical fluid or subcritical fluid is supercritical carbon dioxide or subcritical carbon dioxide, wherein the photopolymerizable polymerization precursor is photopolymerized in carbon dioxide under a pressure in the range between 7 MPa and 150 MPa at a temperature in the range between 30° C. and 250° C.

24. The method of producing a polymer according to claim 23, wherein the photopolymerizing step is conducted in the absence of a photopolymerization initiator.

25. The method of producing a polymer according to claim 23, wherein the photopolymerizable polymerization precursor has at least one maleimide group at the terminal.

* * * * *

UNITED STATES PATENT AND TRADEMARK OFFICE
CERTIFICATE OF CORRECTION

PATENT NO. : 7,081,486 B2
APPLICATION NO. : 10/488075
DATED : July 25, 2006
INVENTOR(S) : Genji Imai et al.

It is certified that error appears in the above-identified patent and that said Letters Patent is hereby corrected as shown below:

On the title page: Column 2 OTHER PUBLICATIONS, line 2, After vol. 3 insert --,--.

On the page 2, Column 1: Delete "JP 2001-157802 6/2001", and insert --JP 2001-151802

6/2001--, therefor

Column 9, line 6: Delete "(W/Cm$^2$)" and insert --(W/cm$^2$)--, therefor.

Column 15, formula 2: Delete " 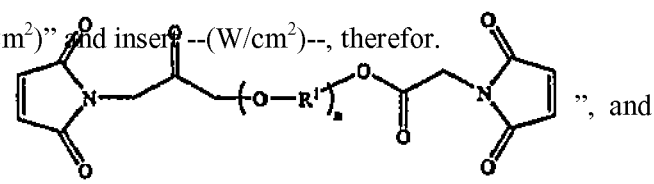 ", and insert -- 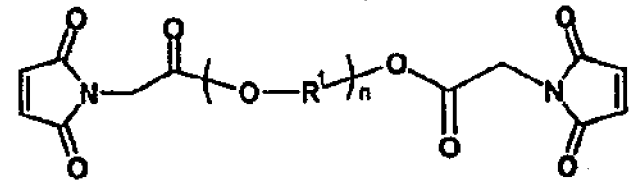 --, therefor.

Column 16, lines 54-55, Delete "1,3-bis(3-maleimidephenoxybenzene" and insert

--1,3-bis(3-maleimidephenoxybenzene)--, therefor.

Column 17, line 32, Delete "N,N'-p,p'diphenyldimethylsilylbismaleimide," and insert -- N,N'-p,p'-diphenyldimethylsilylbismaleimide,--, therefor.

Column 18, line 15-16, Delete "bis(3-fluoro-5-maleimidephenyl) sulfide," and insert --bis(3-fluoro-5-maleimidephenyl)sulfide,--, therefor.

Column 18, line 17-18, Delete "bis(3-fluoro-5-maleimidephenyl) sulfone," and insert --bis(3-fluoro-5-maleimidephenyl)sulfone,-- therefor.

Column 18, line 57, Before "dodecyl" delete "decyl (meth)acrylate,".

Column 22, line 25, Delete "isbutyl" and insert --isobutyl--, therefor.

Column 24, line 49, Delete "ray transmittable" and insert --ray-transmittable--, therefor.

UNITED STATES PATENT AND TRADEMARK OFFICE
CERTIFICATE OF CORRECTION

PATENT NO.       : 7,081,486 B2
APPLICATION NO.  : 10/488075
DATED            : July 25, 2006
INVENTOR(S)      : Genji Imai et al.

It is certified that error appears in the above-identified patent and that said Letters Patent is hereby corrected as shown below:

Column 32, line 23, claim 11

Delete formula 2, " 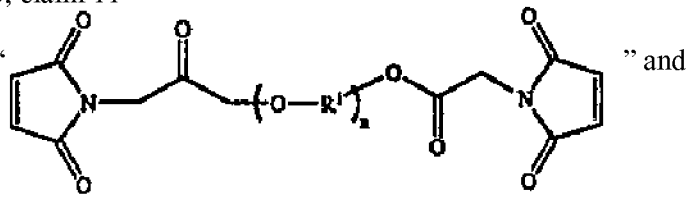 " and insert

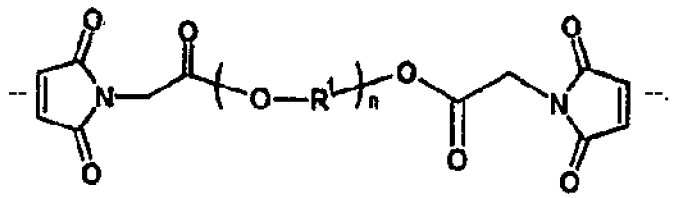

Signed and Sealed this

Twentieth Day of February, 2007

JON W. DUDAS
*Director of the United States Patent and Trademark Office*